(12) United States Patent
Tsujii et al.

(10) Patent No.: US 11,340,072 B2
(45) Date of Patent: May 24, 2022

(54) INFORMATION PROCESSING APPARATUS, INFORMATION PROCESSING METHOD, AND RECORDING MEDIUM

(71) Applicant: SONY CORPORATION, Tokyo (JP)

(72) Inventors: Takahiro Tsujii, Kanagawa (JP); Tomohisa Takaoka, Kanagawa (JP); Haruto Takeda, Tokyo (JP)

(73) Assignee: SONY CORPORATION, Tokyo (JP)

( * ) Notice: Subject to any disclaimer, the term of this patent is extended or adjusted under 35 U.S.C. 154(b) by 304 days.

(21) Appl. No.: 16/487,996

(22) PCT Filed: Dec. 26, 2017

(86) PCT No.: PCT/JP2017/046625
§ 371 (c)(1),
(2) Date: Aug. 22, 2019

(87) PCT Pub. No.: WO2018/179644
PCT Pub. Date: Oct. 4, 2018

(65) Prior Publication Data
US 2020/0033127 A1   Jan. 30, 2020

(30) Foreign Application Priority Data

Mar. 27, 2017   (JP) .............................. JP2017-060966

(51) Int. Cl.
| | |
|---|---|
| G01C 21/00 | (2006.01) |
| G01C 21/16 | (2006.01) |
| G01S 19/48 | (2010.01) |
| G06F 1/3206 | (2019.01) |
| G06T 19/00 | (2011.01) |

(52) U.S. Cl.
CPC ............ *G01C 21/165* (2013.01); *G01S 19/48* (2013.01); *G06F 1/3206* (2013.01); *G06T 19/006* (2013.01)

(58) Field of Classification Search
None
See application file for complete search history.

(56) References Cited

U.S. PATENT DOCUMENTS

| | | | | |
|---|---|---|---|---|
| 2005/0222768 A1* | 10/2005 | Tauchi | ................. | G01S 19/396 |
| | | | | 701/469 |
| 2007/0273575 A1* | 11/2007 | Yang | ....................... | G01S 13/36 |
| | | | | 342/127 |

(Continued)

FOREIGN PATENT DOCUMENTS

| | | |
|---|---|---|
| CN | 102958114 A | 3/2013 |
| CN | 106603688 A | 4/2017 |

(Continued)

OTHER PUBLICATIONS

Office Action for CN Patent Application No. 201780088697.4, dated Sep. 1, 2020, 06 pages of Office Action and 09 pages of English Translation.

(Continued)

*Primary Examiner* — Martin Mushambo
(74) *Attorney, Agent, or Firm* — Chip Law Group

(57) ABSTRACT

Provided is a mechanism that enables the balance between the satisfaction of measurement accuracy required for an application and the suppression of power consumption. An information processing apparatus includes a control unit that acquires information indicating required accuracy of measurement information based on a result of detection by a sensor from the application that uses the measurement information, and controls the sensor on the basis of the information indicating the required accuracy.

19 Claims, 15 Drawing Sheets

(56) References Cited

U.S. PATENT DOCUMENTS

| | | | | |
|---|---|---|---|---|
| 2014/0225923 A1* | 8/2014 | Huang | ................ | H04W 4/025 |
| | | | | 345/633 |
| 2014/0342750 A1* | 11/2014 | Kwak | ...................... | G01S 5/02 |
| | | | | 455/456.1 |
| 2016/0057708 A1* | 2/2016 | Siomina | ............ | H04W 72/1263 |
| | | | | 455/452.2 |
| 2018/0059255 A1* | 3/2018 | Chan | ................. | G01C 21/3655 |
| 2018/0115711 A1* | 4/2018 | Kato | ...................... | G01C 21/26 |

FOREIGN PATENT DOCUMENTS

| | | | |
|---|---|---|---|
| CN | 106790268 | A | 5/2017 |
| EP | 2750438 | A1 | 7/2014 |
| JP | 2007-003531 | A | 1/2007 |
| JP | 2010-139321 | A | 6/2010 |
| JP | 2012-251936 | A | 12/2012 |
| JP | 2012251936 | A * | 12/2012 |
| JP | 2013-140171 | A | 7/2013 |
| JP | 2013-239124 | A | 11/2013 |
| JP | 2014-531632 | A | 11/2014 |
| WO | 2013/029388 | A1 | 3/2013 |

OTHER PUBLICATIONS

International Search Report and Written Opinion of PCT Application No. PCT/JP2017/046625, dated Mar. 20, 2018, 14 pages of ISRWO.

Office Action of JP Patent Application No. 2019-508580, dated Nov. 24, 2021, 08 pages of English Translation and 08 pages of Office Action.

* cited by examiner

FIG. 7
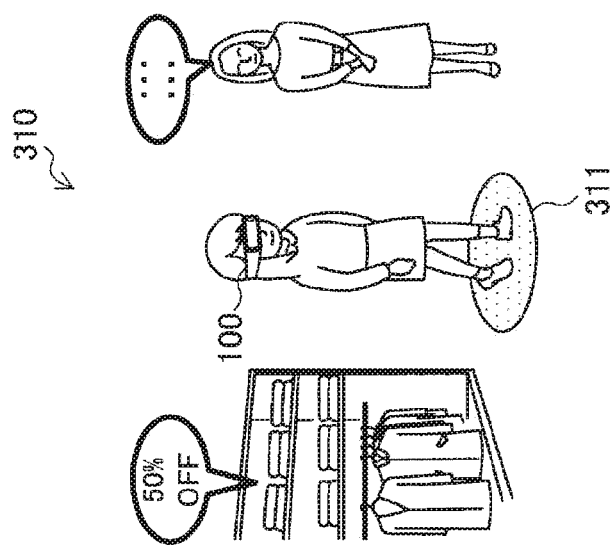
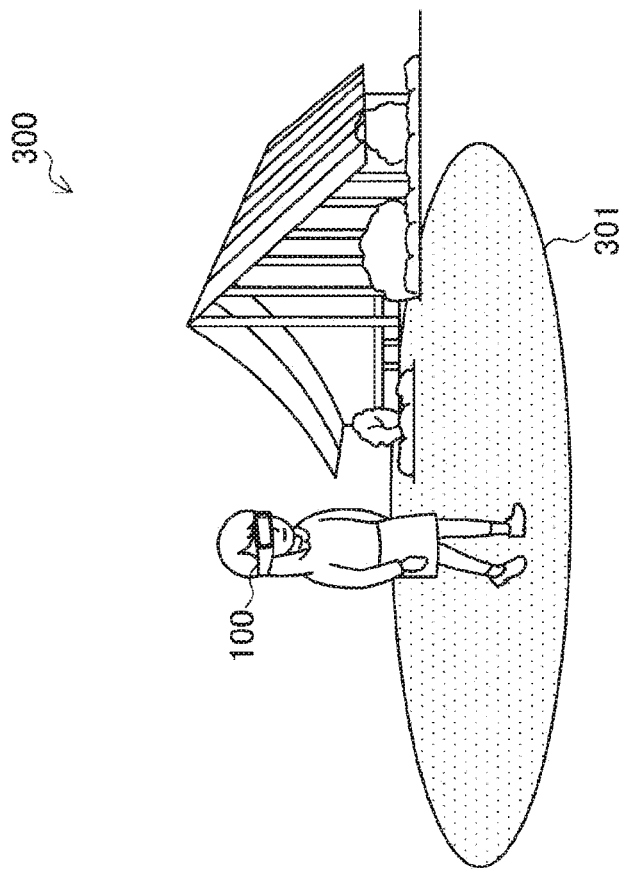

INFORMATION PROCESSING APPARATUS, INFORMATION PROCESSING METHOD, AND RECORDING MEDIUM

CROSS REFERENCE TO RELATED APPLICATIONS

This application is a U.S. National Phase of International Patent Application No. PCT/JP2017/046625 filed on Dec. 26, 2017, which claims priority benefit of Japanese Patent Application No. JP 2017-060966 filed in the Japan Patent Office on Mar. 27, 2017. Each of the above-referenced applications is hereby incorporated herein by reference in its entirety.

TECHNICAL FIELD

The present disclosure relates to an information processing apparatus, an information processing method, and a recording medium.

BACKGROUND ART

In recent years, there have been variously used technologies with a camera, a microphone, a global positioning system (GPS), and a variety of sensors such as an inertial sensor. For example, self-position estimation and orientation estimation with sensor fusion have been developed for devices with less power constraints, such as airplanes and vehicles. In recent years, however, such self-position estimation and orientation estimation, however, have begun to be used for wearable terminals such as head mounted displays (HMD) and wristband-type terminals. For such wearable terminals, there has been expected development of a technology for suppressing power consumption with efficient use of various mounted sensors, due to size constraint for a mountable battery.

As an example, Patent Document 1 below discloses a technology in which in self-position estimation with a plurality of cameras, a camera to be used is restricted in accordance with the feature amount of a captured image and reception results of GPS signals, thereby enabling self-position estimation with less power consumption.

CITATION LIST

Patent Document

Patent Document 1: Japanese Patent Application Laid-Open No. 2016-197083

SUMMARY OF THE INVENTION

Problems to be Solved by the Invention

However, for measurement technologies for self-position estimation, orientation estimation, and the like described in Patent Document 1 above, there is no consideration about the degree of accuracy of the result of measurement required by an application that uses a result of measurement. Therefore, there is a case where a result of measurement with too high accuracy is provided to some applications, and in such a case, it can be said that power consumption can be further suppressed. On the other hand, there is also a case of provision of a result of measurement with too low accuracy to some applications, and in such a case, decrease in performance may occur in exchange for suppression of power consumption.

Therefore, it is desirable to provide a mechanism that enables the balance between the satisfaction of measurement accuracy required by an application and the suppression of power consumption.

Solutions to Problems

According to the present disclosure, there is provided an information processing apparatus including a control unit configured to acquire information indicating required accuracy of measurement information based on a result of detection by a sensor from an application that uses the measurement information, and control the sensor on the basis of the information indicating the required accuracy.

Furthermore, according to the present disclosure, there is provided an information processing apparatus including a control unit configured to perform processing with measurement information based on a result of detection by a sensor, and generate information indicating required accuracy of the measurement information in accordance with details of the processing.

Furthermore, according to the present disclosure, there is provided an information processing method performed by a processor, including: acquiring information indicating required accuracy of measurement information based on a result of detection by a sensor from an application that uses the measurement information; and controlling the sensor on the basis of the information indicating the required accuracy.

Furthermore, according to the present disclosure, there is provided an information processing method performed by a processor, including: performing processing with measurement information based on a result of detection by a sensor; and generating information indicating required accuracy of the measurement information in accordance with details of the processing.

Furthermore, according to the present disclosure, there is provided a recording medium including a program recorded, the program causing a computer to function as a control unit configured to acquire information indicating required accuracy of measurement information based on a result of detection by a sensor from an application that uses the measurement information, and control the sensor on the basis of the information indicating the required accuracy.

Furthermore, according to the present disclosure, there is provided a recording medium including a program recorded, the program causing a computer to function as a control unit configured to perform processing with measurement information based on a result of detection by a sensor, and generate information indicating required accuracy of the measurement information in accordance with details of the processing.

According to the present disclosure, the information processing apparatus controls the sensor in accordance with the accuracy required by the application. This arrangement makes it possible to suppress power consumption, with the measurement accuracy required by the application satisfied.

Effects of the Invention

As described above, according to the present disclosure, there is provided a mechanism that enables the balance between the satisfaction of measurement accuracy required by an application and the suppression of power consumption. Note that the above effect is not necessarily restrictive; and in addition to or instead of the above effect, there can

BRIEF DESCRIPTION OF DRAWINGS

FIG. 7 is an illustration for describing the overview of a first embodiment.

MODE FOR CARRYING OUT THE INVENTION

Preferred embodiments of the present disclosure will be described in detail below with reference to the accompanying drawings. Note that, in the present specification and the drawings, the same reference signs are given to constituent elements having substantially the same functional configurations, and redundant description will be omitted.

Note that the description will be given in the following order.

1. Basic Configuration
2. First Embodiment
2.1. Overview
2.2. Technical Features
3. Second Embodiment
3.1. Overview
3.2. Technical Features
4. Third Embodiment
4.1. Overview
4.2. Technical Features
5. Supplement
6. Exemplary Hardware Configuration
7. Conclusion

1. Basic Configuration

First, with reference to FIGS. 1 to 5, the basic configuration of an information processing apparatus according to an embodiment of the present disclosure will be described.

(1) Exemplary Exterior Appearance Configuration

Figure 1:
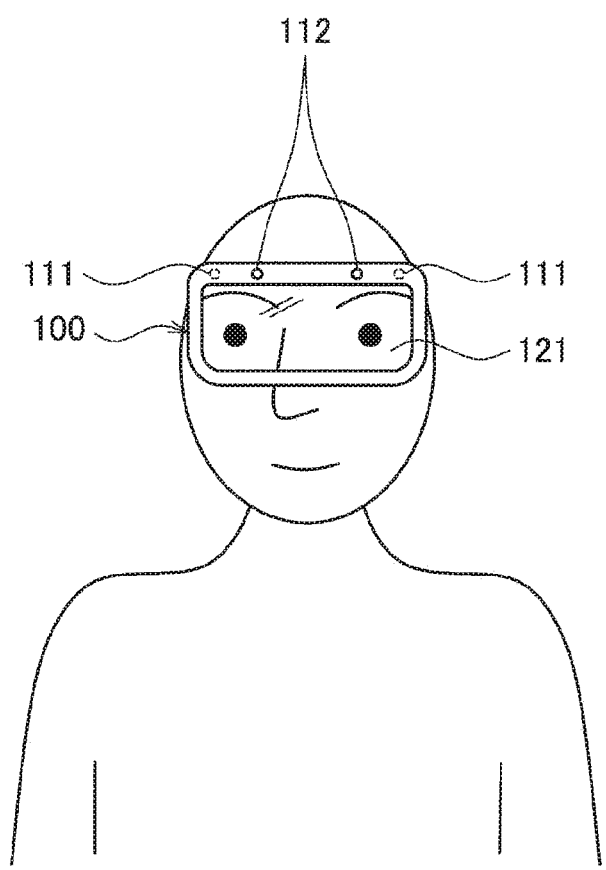
FIG. 1 is an illustration of an exemplary exterior appearance configuration of an information processing apparatus according to an embodiment of the present disclosure.

FIG. 1 is an illustration of an exemplary exterior appearance configuration of the information processing apparatus according to the embodiment of the present disclosure. An information processing apparatus 100 illustrated in FIG. 1 is also referred to as an HMD.

The information processing apparatus 100 has, for example, a wearing unit of a frame structure that makes a half turn through the temple regions and back of the head, and as illustrated in FIG. 1, the information processing apparatus 100 is hanged on the auditory capsules to be worn by the user. Then, the information processing apparatus 100 has a display unit 121 disposed immediately in front of the user's eyes, with the information processing apparatus 100 worn as illustrated in FIG. 1. The display unit 121 includes, for example, a liquid crystal panel, and the information processing apparatus 100 controls the transmittance of the liquid crystal panel to allow the liquid crystal panel to be in a through state, that is, in a transparent or translucent state, or in a non-transmissive state.

Moreover, the display unit 121, still in the through state, displays an image such as text or a drawing, thereby allowing augmented reality (AR) information (i.e., annotation) to be superimposed and displayed on scenery in real space. Furthermore, the display unit 121, in the non-transmissive state, is capable of displaying a captured image of the real space captured by an outward camera 112, and superimposing and displaying an annotation on the captured image of the real space.

On the other hand, the display unit 121, in the non-transmissive state, is capable of displaying virtual reality (VR) information. For example, in the non-transmissive state, the display unit 121 is also capable of reproducing and displaying content received by the information processing apparatus 100 from an external apparatus or content stored in a storage medium of the information processing apparatus 100, and also capable of superimposing and displaying an annotation on the reproduced and displayed content. Note that the external apparatus is, for example, a server, a digital camera, a digital video camera, or an information processing apparatus such as a mobile phone terminal, a smartphone, or a personal computer (PC).

Note that hereinafter, the entirety of an image to be displayed on the display unit 121 is also referred to as a screen. Here, the screen is defined as a concept including an image to be displayed in a non-transmissive state, and a spectacle to be transparently displayed and an annotation to be superimposed and displayed thereon in a through state. Furthermore, each of elements included in the screen is also referred to as a virtual object, and the virtual object is defined as a concept including, for example, an annotation.

Furthermore, the information processing apparatus 100 has a pair of inward cameras 111 facing the user disposed such that the user is captured from a short distance, with the information processing apparatus 100 worn by the user. Each of the inward cameras 111 functions as a first image sensor that captures an eye of the user. The inward camera 111 may be a stereo camera that is also capable of acquiring depth information, or may be provided with a depth sensor.

Furthermore, the information processing apparatus 100 has the outward camera 112 disposed forward, in order to capture, as a capturing direction, a direction that the user faces (e.g., a direction that the user visually recognizes in a case where the display unit 121 is in a through state), with the information processing apparatus 100 worn by the user. The outward camera 112 functions as a second image sensor that captures a subject to be recognized such as a hand of the user. The outward camera 112 may be a stereo camera capable of acquiring depth information, or may be provided with a depth sensor.

Furthermore, although not illustrate in FIG. 1, an earphone speaker to be inserted into each of the user's auditory capsules may be disposed, with the information processing apparatus 100 worn by the user. Furthermore, although not illustrated in FIG. 1, a microphone for absorbing an external sound may be disposed.

Note that the information processing apparatus 100 according to the present embodiment may be an HMD as illustrated in FIG. 1, or may be, for example, a simple HMD including a smartphone fixed in front of an eye of the user. In such a case, a display, an in-camera provided on the display side, and an out-camera provided on the back face side of the smartphone function as the display unit 121, the inward camera 111, and the outward camera 112 described above, respectively.

Besides, the information processing apparatus 100 can be achieved as, for example, a smartphone, a tablet terminal, a PC, or digital signage, other than the HMD.

The exterior appearance configuration of the information processing apparatus 100 has been described above. Subsequently, an internal configuration of the information processing apparatus 100 will be described. Hereinafter, the information processing apparatus 100 will be described as being the HMD.

(2) Internal Configuration

Figure 2:
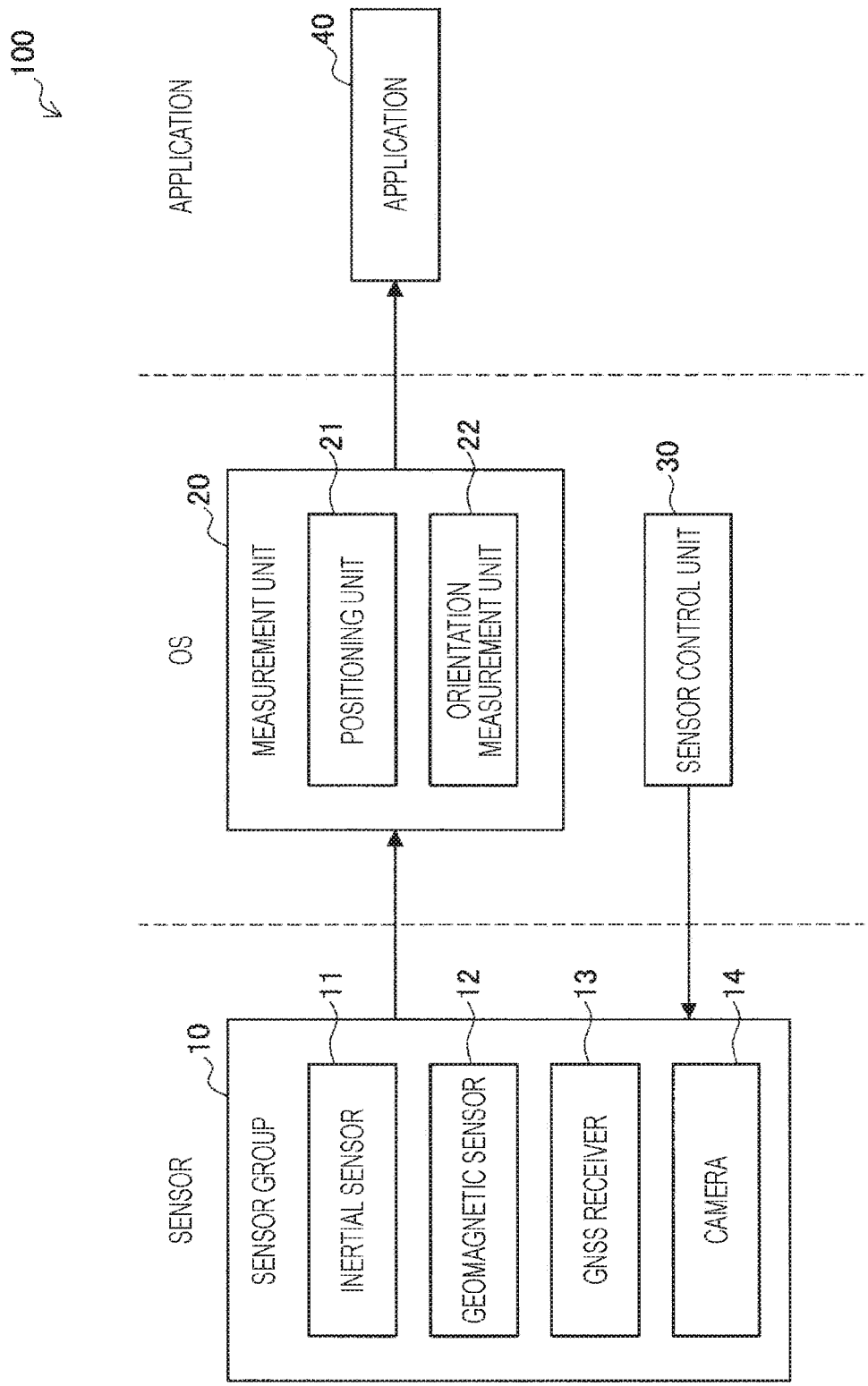
FIG. 2 is a block diagram of an exemplary internal configuration of an HMD according to the embodiment.

FIG. 2 is a block diagram of an exemplary internal configuration of the HMD 100 according to the present embodiment. As illustrated in FIG. 2, the information processing apparatus 100 according to the present embodiment includes a plurality of constituent elements classified into a sensor, an operating system (OS), or an application. The constituent elements classified into the sensor are physical constituent elements, and the constituent elements classified into the OS or the application are logical constituent elements. For example, the constituent elements classified into the OS or the application can be included as software to be operated by an arithmetic device such as a central processing unit (CPU) in accordance with a program stored in a storage device such as a memory.

Sensor

The HMD 100 includes a sensor group 10 including various sensors as a sensor. The sensor group 10 includes an inertial sensor 11, a geomagnetic sensor 12, a global navigation satellite system (GNSS) receiver 13, and a camera 14.

The inertial sensor 11 detects angular velocity and acceleration in, for example, three axes. The geomagnetic sensor 12 detects the magnitude and direction of the magnetic field. The GNSS receiver 13 receives a GNSS signal (single-frequency or dual-frequency) from a GNSS satellite. The camera 14 includes a lens system, a drive system that drives the lens system, and an image capturing element that generates an image capturing signal from captured light obtained by the lens system, and outputs data of a captured image converted into a digital signal. The camera 14 includes the inward cameras 111 and the outward camera 112 illustrated in FIG. 1.

The sensor may be included in, for example, a wearable device separate from the HMD 100. That is to say, the HMD 100 can take a sensor of a different device as a control target.

The sensor group 10 outputs information indicating the results of detection by the various sensors (hereinafter, also referred to as sensor information) to a measurement unit 20. The sensor information is used for measurement (or estimation) of a position or an orientation by the measurement unit 20. The sensor group 10 may further include any sensor that detects sensor information usable for estimation of the position or orientation For example, the sensor group 10 can have a wireless communication device capable of performing communication conforming to any wireless communication standard such as Wi-Fi (registered trademark), and, for example, can measure a position on the basis of radio wave intensity associated with communication with an access point (or base station).

The sensor group 10 can include a variety of other sensors. For example, the sensor group 10 may have a wireless communication device capable of performing communication conforming to any wireless communication standard such as Bluetooth low energy (BLE (registered trademark)), Wi-Fi, or visible light communication. Furthermore, the sensor group 10 may have, for example, an infrared camera, an integrated circuit (IC) gate, a millimeter wave radar, a light detection and ranging (LiDAR), a range sensor, a laser Doppler sensor, a vehicle speed pulse sensor, a biometric information sensor, or a temperature sensor.

OS

The HMD 100 includes a measurement unit 20 and a sensor control unit 30 as one function of the OS.

Measurement Unit

The measurement unit 20 measures measurement information on the basis of sensor information. The measurement information includes at least either position information or orientation information. Hereinafter, the position information and the orientation information may be collectively referred to as measurement information.

As illustrated in FIG. 2, the measurement unit 20 includes a positioning unit 21 and an orientation measurement unit 22. The positioning unit 21 measures the position information (i.e., performs positioning) on the basis of sensor information output from the sensor group 10. The position information may be information indicating an absolute position including latitude and longitude, or information indicating a relative position with respect to a reference object. Furthermore, the position information may include altitude information. The orientation measurement unit 22 measures the orientation information on the basis of the sensor information output from the sensor group 10. The orientation information may be information indicating an absolute orientation with respect to the ground, or information indicating a relative orientation with respect to a reference object.

For example, the measurement unit 20 may measure the position information on the basis of the reception result of a GNSS signal. Furthermore, the measurement unit 20 may measure the position information and the orientation information on the basis of a captured image, with use of a technique such as simultaneous localization and mapping (SLAM), for example. Furthermore, the measurement unit 20 may measure the position information and the orientation information on the basis of a direction of geomagnetism. Furthermore, the measurement unit 20 may measure the position information and the orientation information, with use of a technique such as pedestrian dead-reckoning (PDR) or inertial navigation. Furthermore, the measurement unit 20 may measure the position information or the orientation information, with a combination of a plurality of pieces of sensor information and a plurality of measurement methods.

Sensor Control Unit

The sensor control unit 30 controls the various sensors included in the sensor group 10. Specifically, the sensor control unit 30 controls the sensor group 10 group, more specifically, the various sensors included in the sensor group 10, on the basis of information indicating a required accuracy of the measurement information.

The sensor control unit 30 can perform various sensor control. For example, the sensor control unit 30 may control ON/OFF (i.e., activation/stop) of each sensor. The sensor control unit 30 stops an unnecessary sensor, thereby enabling suppression of power consumption for the sensor. Furthermore, the sensor control unit 30 may control the operation frequency of the sensor. The sensor control unit 30 increases and decreases the operation frequency, thereby enabling the fine adjustment of the measurement accuracy and the power consumption. Furthermore, the sensor control unit 30 may control the accuracy of the sensor. The sensor control unit 30 increases and decreases the accuracy of the sensor, thereby enabling the fine adjustment of the measurement accuracy and the power consumption. The control of accuracy of the sensor can be performed, for example, by controlling the amount of power to be supplied to the sensor. Such details of the control such as which sensor is operated at which frequency and with which accuracy are hereinafter also referred to as a control pattern.

The sensor control unit 30 controls the sensor group 10 such that power consumption is suppressed with the required accuracy of the measurement information satisfied, further on the basis of the characteristics of each sensor. The sensor control unit 30 controls the sensor group 10 such that the sum total of power consumption is minimized with the required accuracy satisfied. That is to say, the sensor control unit 30 determines a control pattern with the lowest power consumption that satisfies the required accuracy. Examples of the characteristics of the sensor include, power consumption, contribution of orientation measurement accuracy, contribution of position measurement accuracy, and availability. Table 1 indicates one example of the characteristics of the sensor.

TABLE 1

Characteristics of Sensors

| Sensor | Power consumption | Contribution of orientation measurement accuracy | Contribution of position measurement accuracy | Availability |
| --- | --- | --- | --- | --- |
| Inertial sensor | 1 mW | High | Low | Available |
| Geomagnetic sensor | 1 mW | Moderate | Low | Non-available |
| GNSS receiver (Single-frequency) | 3 mW | Moderate | Moderate | Available |
| GNSS receiver (Dual-frequency) | 6 mW | High | High | Available |
| Camera | 50 mW | High | High | Available |

Besides the example indicated in Table 1 above, the characteristics of the sensor can include the accuracy of the sensor. Typically, the higher the accuracy of the sensor is, the higher the measurement accuracy by the measurement unit 20 is. The characteristics of the sensor may be pre-stored, or updated in accordance with a situation. For example, the power consumption of each sensor may be actually measured with a current sensor. Furthermore, estimation for the accuracy of the sensor may be changed in accordance with external factors such as the intensity of motion of the HMD 100, radio wave reception statuses, the intensity of ambient light, or the number of feature points included in a captured image. Furthermore, the accuracy of the sensor may be measured by comparison with a different sensor.

Here, the information indicating the required accuracy may include at least any of absolute position accuracy, absolute orientation accuracy, relative position accuracy, or relative orientation accuracy. The absolute position accuracy indicates the required accuracy of absolute position information. The absolute orientation accuracy indicates the required accuracy of absolute orientation information. The relative position accuracy indicates the required accuracy of relative position information. The relative orientation accuracy indicates the required accuracy of relative orientation information. In a case where the information indicating the required accuracy includes the pieces of the information, the sensor control unit 30 controls the sensor group 10 on the basis of the piece of the information.

For example, in a case where the absolute position accuracy is 5 m and the absolute orientation accuracy is 1°, the sensor control unit 30 activates the inertial sensor 11 and the GNSS receiver 13 (dual-frequency), and stops a camera. As described above, the sensor control unit 30 determines a control pattern, for example, which sensor is operated at which frequency and with which accuracy, in accordance with the required accuracy. Moreover, the sensor control unit 30 may adjust a control pattern in accordance with whether or not the result of measurement that is actually measured satisfies the required accuracy. Such control enables the HMD 100 to suppress power consumption with the required accuracy satisfied.

Besides, the information indicating the required accuracy can include various information.

For example, the information indicating the required accuracy may include an index corresponding to the required accuracy. Specifically, the information indicating the required accuracy may include, for example, an index for a high accuracy measurement mode or an index for a low accuracy measurement mode. In such a case, the sensor control unit 30 controls the sensor group 10 on the basis of absolute position accuracy, absolute orientation accuracy, relative position accuracy, and relative orientation accuracy corresponding to the index.

For example, the information indicating the required accuracy may include information indicating availability of a sensor. In such a case, the sensor control unit 30 controls the sensor group 10 such that only an available sensor operates. As the availability of the sensor, it may be considered that a camera is non-available due to difficulty in capturing a clear image at night, for example.

For example, the information indicating the required accuracy may include information indicating the intensity of assumed motion. The sensor control unit 30 controls the sensor group 10 so as to stop a sensor (e.g., inertial sensor 11) having an tendency in which an error is larger in a case where active motion is assumed and operate a sensor capable of perform stable detecting (e.g., GNSS receiver 13). Examples of an application for which active motion is assumed include an application for tennis to be described with reference to FIG. 5.

For example, the information indicating the required accuracy may include information indicating an object as a reference in measurement of relative measurement information (e.g., relative position or relative orientation). For example, the sensor control unit 30 decreases the capturing frequency of a camera for a stationary object as the reference object, and increases the capturing frequency of the camera for a movable object as the reference object.

For example, the information indicating the required accuracy may be information indicating a control pattern, for example, which sensor is operated at which frequency and with which accuracy. In this case, the sensor control unit 30 controls the sensor group 10 in accordance with the information indicating the control pattern.

For example, the information indicating the required accuracy may be associated with position information (e.g., a geographical range as described later in a second embodiment). In this case, the sensor control unit 30 controls the sensor group 10, on the basis of the information indicating the required accuracy corresponding to a position of the sensor group 10.

Applications

The HMD 100 is capable of operating various applications 40. The applications 40 each perform processing with sensor information. More specifically, the application 40 uses position information and orientation information generated on the basis of the sensor information. For example, the application 40 may be an AR application that superimposes and displays a virtual object (i.e., annotation) in the real space displayed on the display unit 121, with use of the position information and the orientation information.

Here, the required accuracy can be different for each application. Hereinafter, with reference to FIGS. 3 to 5, an example of the required accuracy different for each application will be described.

Figure 3:
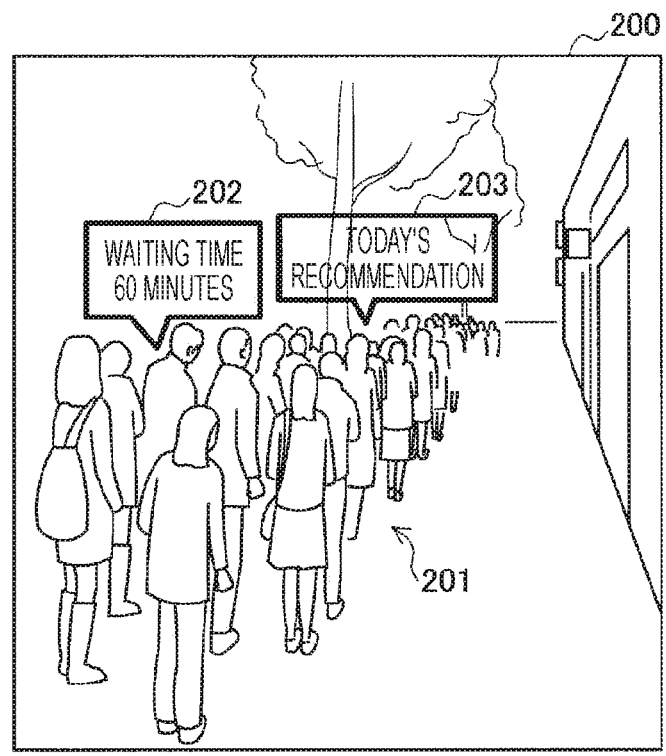
FIG. 3 is an illustration of an exemplary screen displayed by the HMD according to the embodiment.

FIG. 3 is an illustration of an exemplary screen displayed by the HMD 100 according to the present embodiment. As illustrated in FIG. 3, on a screen 200, an annotation 202 indicating a waiting time and an annotation 203 indicating information regarding a store are superimposed above the heads in a line 201 in the real space. For this application, although an annotation is superimposed at a position near the HMD 100, the annotation may be superimposed at a rough position. Therefore, for example, accuracy required by this application is 2 m in absolute position accuracy and 20° in absolute orientation accuracy.

Figure 4:
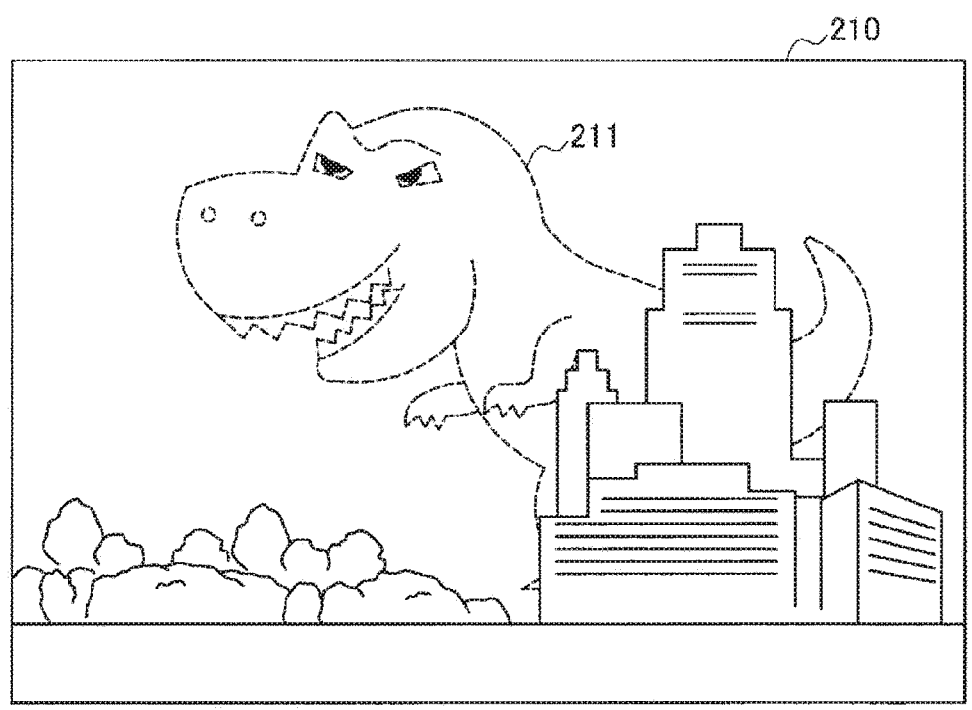
FIG. 4 is an illustration of an exemplary screen displayed by the HMD according to the embodiment.

FIG. 4 is an illustration of an exemplary screen displayed by the HMD 100 according to the present embodiment. As illustrated in FIG. 4, on a screen 210, an annotation 211 of a huge monster is superimposed distantly. For this application, an annotation may be superimposed at a position far from the HMD 100 and at a rough position, whereas it is desirable that the orientation of the monster be accurately superimposed for reality. Therefore, for this application, the absolute position accuracy is 5 m and the absolute orientation accuracy is 1°, for example.

Figure 5:
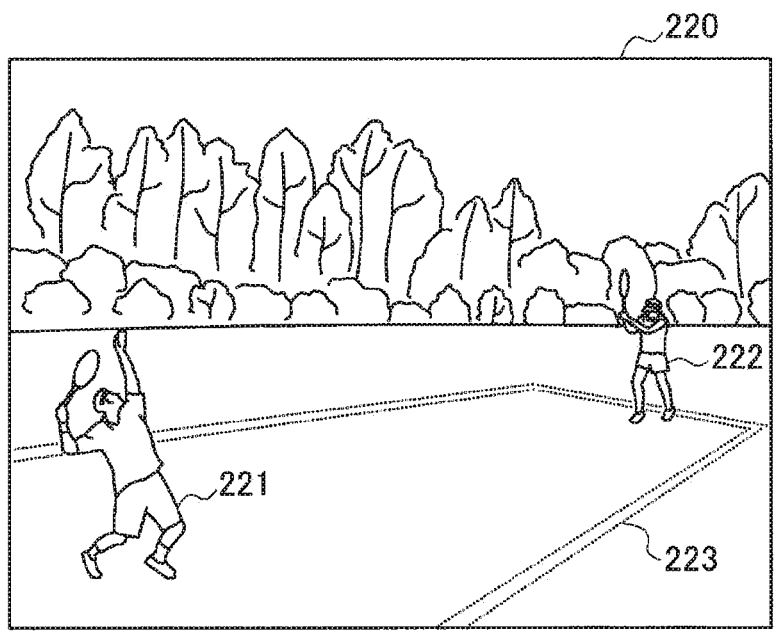
FIG. 5 is an illustration of an exemplary screen displayed by the HMD according to the embodiment.

FIG. 5 is an illustration of an exemplary screen displayed by the HMD 100 according to the present embodiment. As illustrated in FIG. 5, on a screen 220, tennis players 221 and 222 are playing tennis in a space where an annotation 223 of a virtual tennis court is superimposed. For this application, it is desirable that the virtual tennis court be accurately superimposed. Therefore, for this application, the relative position accuracy is 10 cm, and the relative orientation accuracy is 1°, for example.

Furthermore, even for an identical application, the required accuracy can differ depending on a situation. Hereinafter, with reference to FIG. 6, there will be described an exemplary required accuracy that differs depending on a situation, for a life support application for supporting the life of the user.

Figure 6:
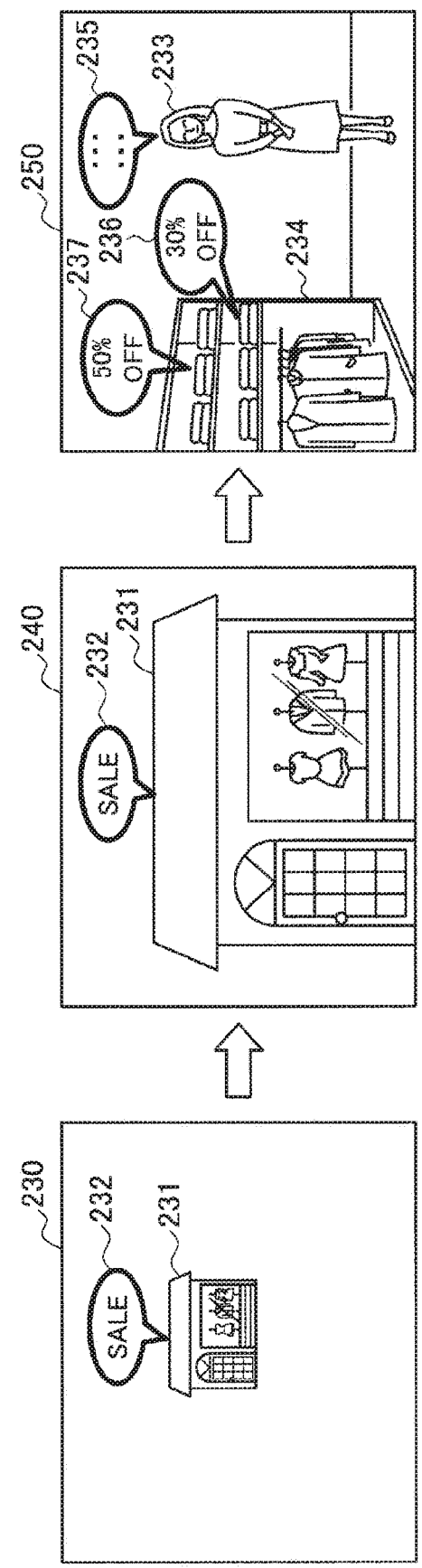
FIG. 6 is an illustration of an exemplary screen displayed by the HMD according to the embodiment.

FIG. 6 is an illustration of an exemplary screen displayed by the HMD 100 according to the present embodiment. As illustrated in FIG. 6, on a screen 230, an annotation 232 indicating that a sale is in progress is superimposed above a store 231 located distantly. In such a situation, an annotation may be superimposed at a position far from the HMD 100 and at a rough position. Thus, the required absolute position accuracy and absolute orientation accuracy are low.

A screen 240 is displayed in a case where the user approaches the store 231. In such a situation, an annotation is superimposed close to the HMD 100. Thus, higher absolute position accuracy and absolute orientation accuracy are required as compared with the case of the screen 230.

A screen 250 is displayed in a case where the user enters the store 231. There are a store worker 233 and a shelf 234 inside the store 231. Then, an annotation 235 indicating a message from the store worker 233 is superimposed in association with the store worker 233, and annotations 236 and 237 each indicating sale information regarding a product displayed on the shelf 234 are superimposed in association with the corresponding product. In such a situation, it is desirable that a deviation between the superimposed position and orientation of an annotation and the position and orientation of an associated real object be as small as possible. Thus, high relative position accuracy and relative orientation accuracy are required.

Besides this case, the required accuracy can change depending on various factors such as the necessity of occlusion processing.

Hereinafter, each embodiment of the present disclosure will be described with, as an example, a life support application for which the required accuracy varies depending on a situation. Note that the description of parts similar to those in the basic configuration described above will be omitted below.

2. First Embodiment

The present embodiment is an embodiment in which sensor control is performed on the basis of information indicating accuracy required from an application. Hereinafter, the present embodiment will be described with reference to FIGS. 7 to 9.

<2.1. Overview>

FIG. 7 is an illustration for describing the overview of the present embodiment. As illustrated in FIG. 7, in a scene 300, the user wearing an HMD 100 is taking a walk outdoors. Then, the application provides route guidance to the user. The application only needs to know the approximate location of the user, so that an error allowable range 301 is wide and the required accuracy is low. Meanwhile, in a scene 310, the user wearing the HMD 100 is shopping indoors. Then, the application supports the user in shopping by, for example, superimposing sales information. The application requires an accurate product location and an accurate store worker location, so that an error allowable range 311 is narrow and the required accuracy is high.

Thus, the HMD 100 according to the present embodiment performs sensor control in accordance with the accuracy required by such an application. For example, the HMD 100 stops a camera in the scene 300 and operates the camera in the scene 310.

<2.2. Technical Features>

(1) Exemplary Configuration

Figure 8:
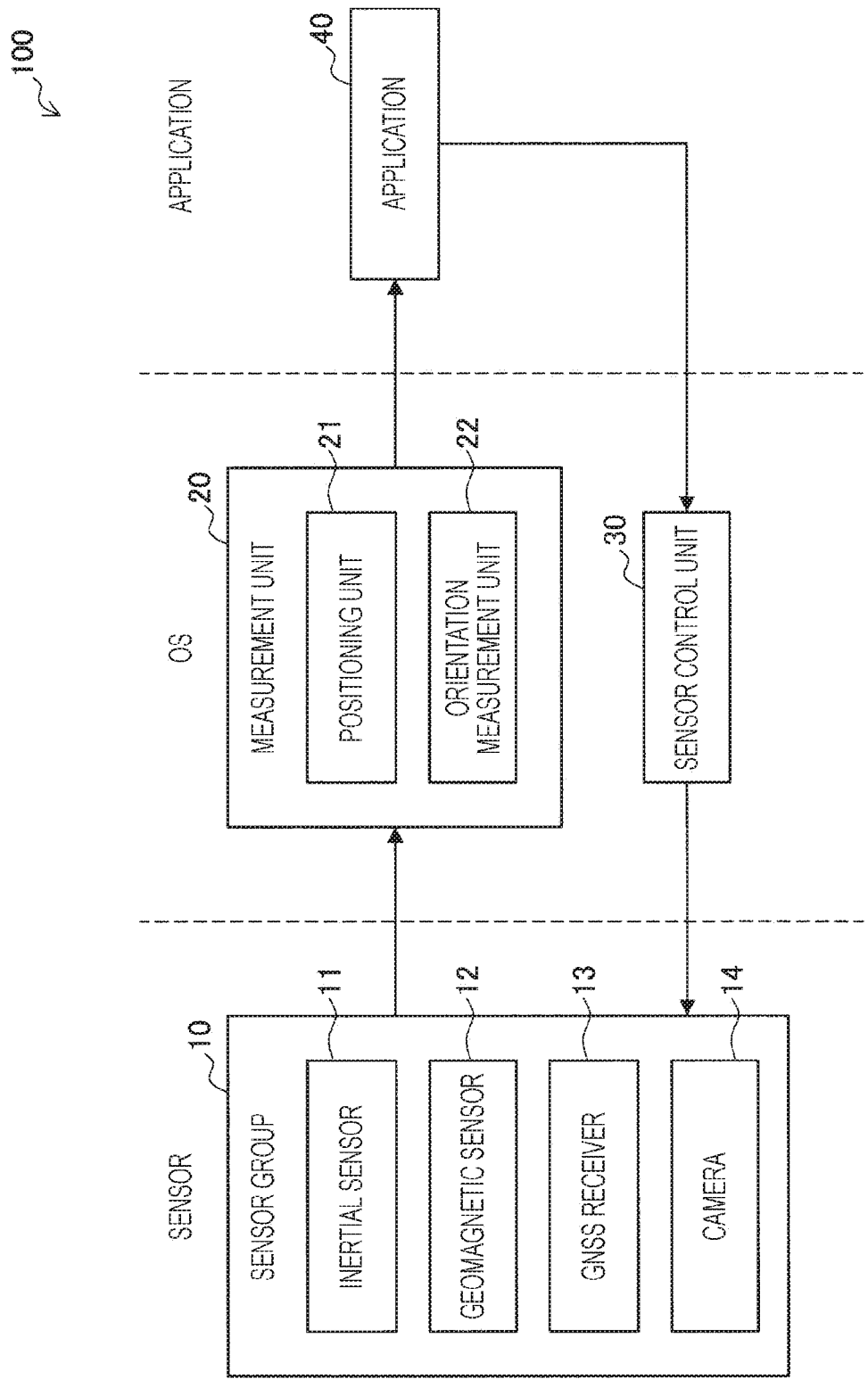
FIG. 8 is a block diagram of an exemplary internal configuration of an HMD according to the embodiment.

FIG. 8 is a block diagram of an exemplary internal configuration of the HMD 100 according to the present embodiment. As illustrated in FIG. 8, the HMD 100 according to the present embodiment has constituent elements similar to the constituent elements of the basic configuration illustrated in FIG. 2, and further has a notification path for information from an application 40 to a sensor control unit 30.

The application 40 generates information indicating the required accuracy of measurement information in accordance with the details of processing. For example, the application 40 may be an AR application that performs processing of superimposing and displaying a virtual object (i.e., an annotation) in the real space. In such a case, the application 40 generates information indicating the required accuracy, in accordance with the annotation size, the superimposition distance, the superimposition accuracy, and the necessity of occlusion processing. For example, the application 40 generates information indicating low required accuracy, in a case where the annotation is large, the superimposition distance is long, the superimposition accuracy is low, or the occlusion processing is unnecessary. Furthermore, the application 40 generates information indicating high required accuracy, in a case where the annotation is small, the superimposition distance is short, the superimposition accuracy is high, or the occlusion processing is to be performed.

The application 40 notifies the sensor control unit 30 of information indicating the required accuracy. For example, the application 40 issues notification on information indicating the required accuracy, at various timings such as activation, cancellation of sleep (e.g., switching from a different application), switching of a scene, or switching of content. Besides, the application 40 may periodically notify the sensor control unit 30 of information indicating the required accuracy. Note that the application 40 may change the required accuracy in accordance with content.

The sensor control unit 30 acquires the information indicating the required accuracy notified from the application 40. The sensor control unit 30 may notify the application 40 of a request for notifying the information indicating the required accuracy to cause the application 40 to issue notification on the information indicating the required accuracy.

Then, the sensor control unit 30 controls the sensor group 10, on the basis of the information indicating the required accuracy acquired from the application 40. For example, in a case where the required accuracy is high, the sensor control unit 30 additionally activates a highly accurate sensor or a highly power-consuming sensor, or operates the sensor with high frequency. On the other hand, in a case where the required accuracy is low, the sensor control unit 30 stops a highly accurate sensor or a highly power-consuming sensor, or operates the sensor with low frequency.

(2) Flow of Processing

Figure 9:
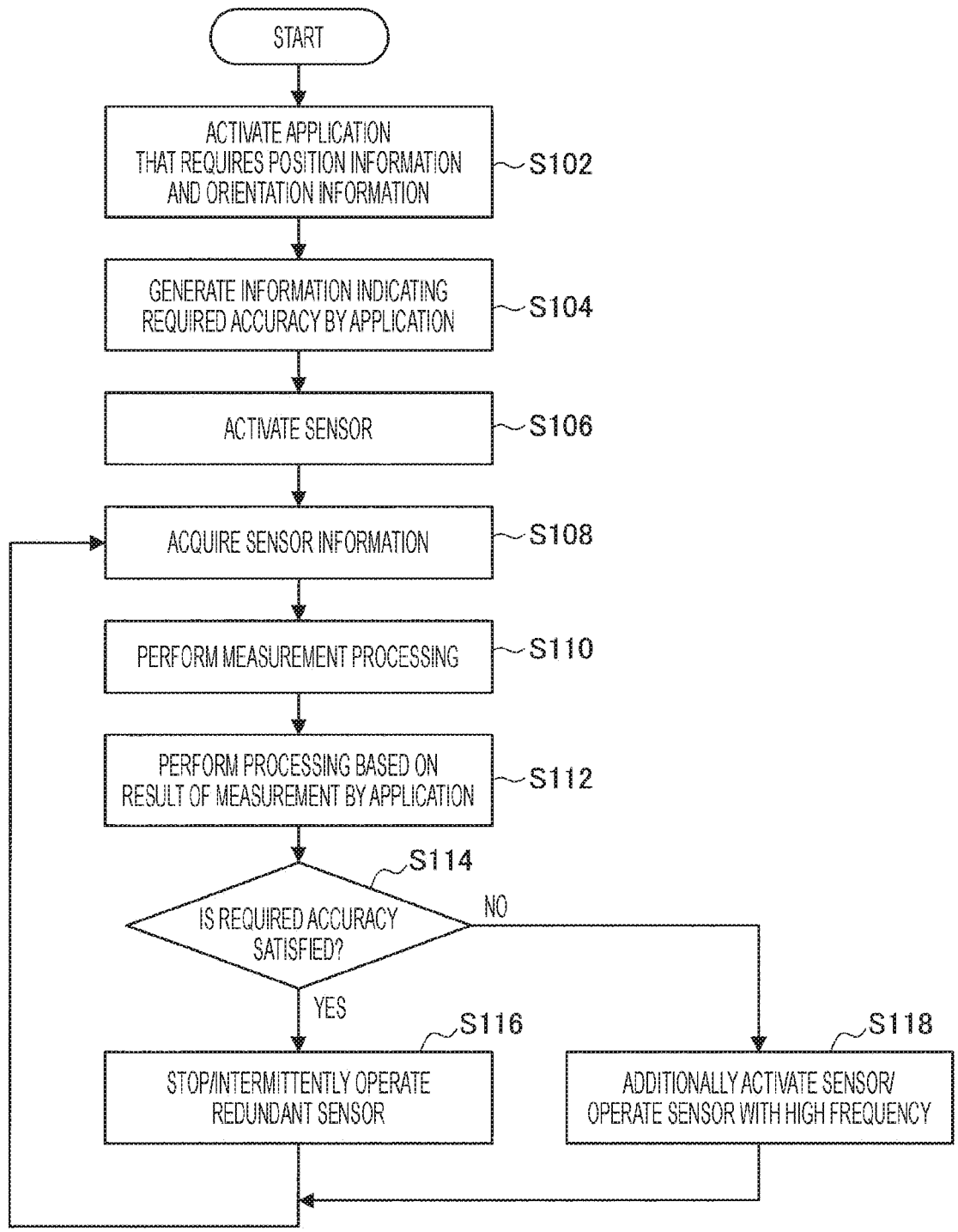
FIG. 9 is a flowchart of an exemplary flow of sensor control processing performed by the HMD according to the embodiment.

FIG. 9 is a flowchart of an exemplary flow of sensor control processing performed by the HMD 100 according to the present embodiment. As illustrated in FIG. 9, first, the HMD 100 activates an application that requires position information and orientation information (step S102). Next, the activated application generates information indicating required accuracy (step S104). Next, the HMD 100 activates a sensor on the basis of the information indicating the required accuracy (step S106). Next, the HMD 100 acquires sensor information detected by the sensor (step S108). Next, the HMD 100 performs measurement processing including position measurement and orientation measurement based on the sensor information (step S110). Next, the application performs processing based on the result of the measurement (step S112). Next, the HMD 100 determines whether or not the result of the measurement satisfies the required accuracy (step S114). In a case where it is determined that the required accuracy is satisfied (step S114/YES), the HMD 100 stops or intermittently operates a redundant sensor (step S116). On the other hand, in a case where it is determined that the required accuracy is not satisfied (step S114/NO), the HMD 100 additionally activates a sensor, or operates the sensor with high frequency (step S118). Thereafter, the processing returns back to step S108 again.

3. Second Embodiment

The present embodiment is an embodiment with use of required accuracy corresponding to position information. Hereinafter, the present embodiment will be described with reference to FIGS. 10 to 12.

<3.1. Overview>

Figure 10:
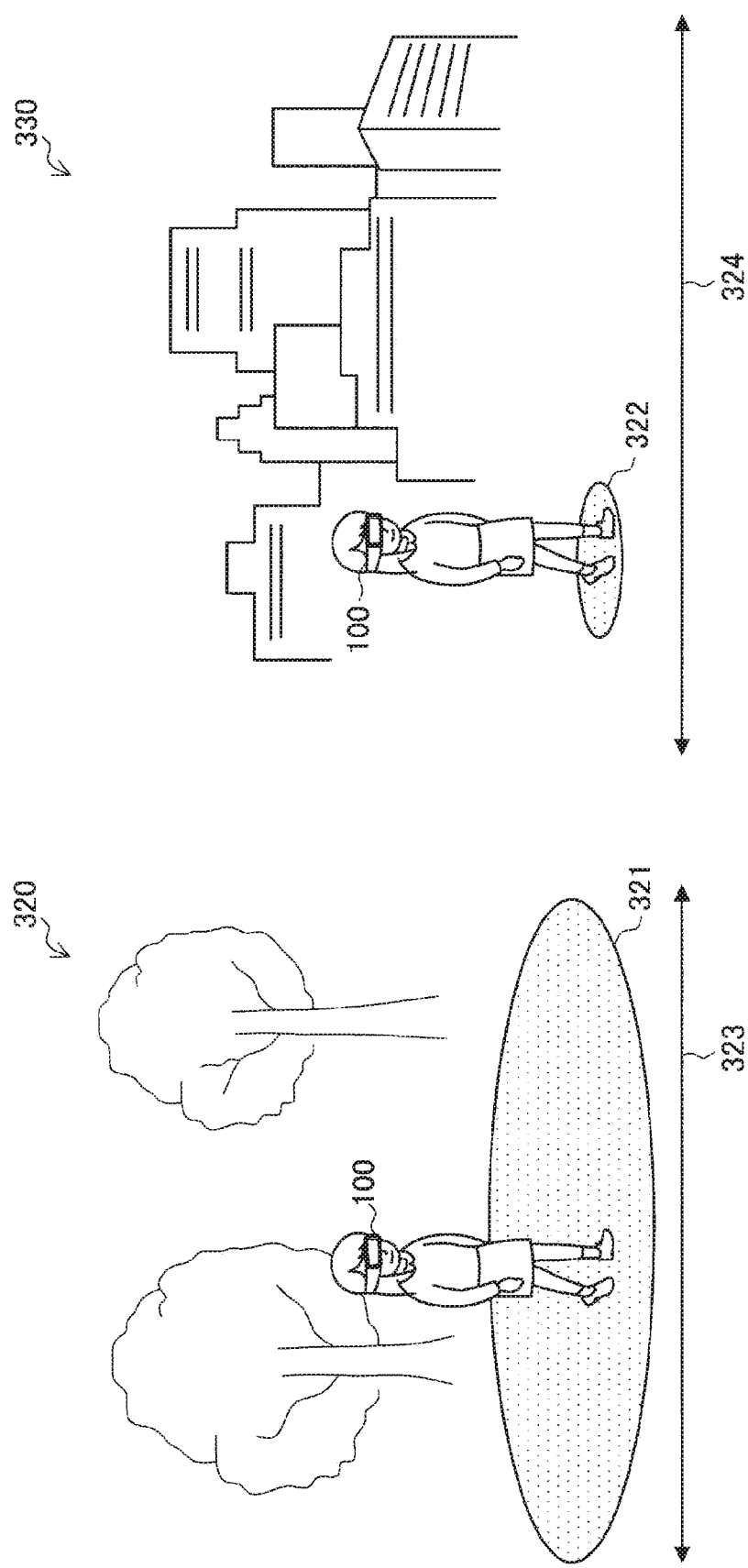
FIG. 10 is an illustration for describing the overview of a second embodiment.

FIG. 10 is an illustration for describing the overview of the present embodiment. As illustrated in FIG. 10, in a scene 320, the user wearing an HMD 100 is taking a walk in an open park. Then, an application provides route guidance to the user. The application only needs to know the approximate location of the user, so that an error allowable range 321 is wide and the required accuracy is low. On the other hand, in a scene 330, the user wearing the HMD 100 is walking in a densely built-up area. Then, an application provides route guidance to the user. The application requires the accurate location of the user for the route guidance in the built-up environment, so that an error allowable range 322 is narrow and the required accuracy is high.

Here, in the present embodiment, the position information is associated with information indicating the required accuracy. For example, a low-accuracy measurement area 323 as a geographical range associated with information indicating low required accuracy, and a high-accuracy measurement area 324 as a geographical range associated with information indicating high required accuracy are set. For example, an area in which required accuracy becomes low, as in the scene 320 is set as the low-accuracy measurement area 323, and an area in which required accuracy becomes high, as in the scene 330 is set as the high-accuracy measurement area 324.

The HMD 100 measures position information with, for example, a GNSS signal or wireless communication such as BLE or Wi-Fi, and determines which area the HMD 100 is located in. Then, in a case where the HMD 100 determines that the HMD 100 is located in the low-accuracy measurement area 323, the HMD 100 performs sensor control according to the low required accuracy. On the other hand, in a case where the HMD 100 determines that the HMD 100 is located in the high-accuracy measurement area 324, the HMD 100 performs sensor control according to the high required accuracy. For example, the HMD 100 stops a camera in a case where the HMD 100 determines that the HMD 100 is located in the low-accuracy measurement area 323, and operates the camera in a case where the HMD 100 determines that the HMD 100 is located in the high-accuracy measurement area 324. In this case, the high-accuracy measurement area 324 can be regarded as a geofence for switching the camera between ON and OFF states.

<3.2. Technical Features>

(1) Exemplary Configuration

Figure 11:
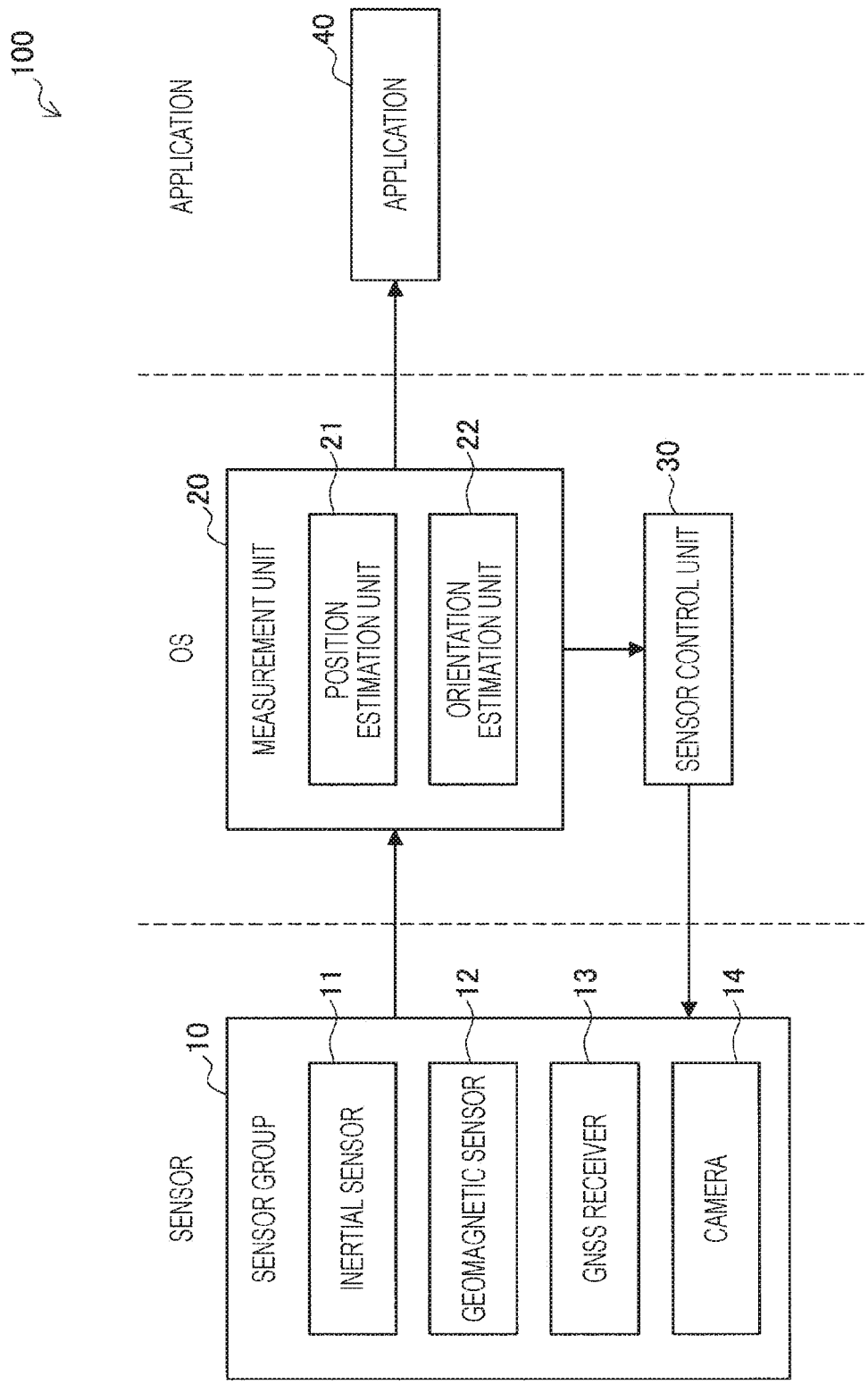
FIG. 11 is a block diagram of an exemplary internal configuration of an HMD according to the embodiment.

FIG. 11 is a block diagram of an exemplary internal configuration of the HMD 100 according to the present embodiment. As illustrated in FIG. 11, the HMD 100 according to the present embodiment has constituent elements similar to the constituent elements of the basic configuration illustrated in FIG. 2, and further has a notification path for information from a measurement unit 20 to a sensor control unit 30.

The measurement unit 20 notifies the sensor control unit 30 of position information. For example, the measurement unit 20 notifies the sensor control unit 30 of the position information periodically or non-periodically.

The sensor control unit 30 acquires the position information notified from the measurement unit 20. The sensor control unit 30 may notify the measurement unit 20 of a request for notifying the position information to cause the measurement unit 20 to issue notification on the position information. Then, the sensor control unit 30 controls the sensor group 10, on the basis of the position information acquired from the measurement unit 20.

Referring to information in which the geographical range is associated with the information indicating the required accuracy, the sensor control unit 30 controls the sensor group 10 on the basis of the information indicating the required accuracy corresponding to the position information acquired from the measurement unit 20. Specifically, in a case where the measured position information is included in a preset geographical range, the sensor control unit 30 controls a sensor on the basis of the information indicating the required accuracy corresponding to the geographical range. For example, in a case where the position information is included in a low-accuracy measurement area, the sensor control unit 30 performs sensor control according to the low required accuracy. On the other hand, in a case where the position information is included in a high-accuracy measurement area, the sensor control unit 30 performs sensor control according to the high required accuracy.

The information in which the geographical range is associated with the information indicating the required accuracy can be stored by a storage unit that is not illustrated. Alternatively, the information in which the geographical range is associated with the information indicating the required accuracy can be stored in an external apparatus such as a server, and can be appropriately transmitted to the HMD 100.

The association between the geographical range and the information indicating the required accuracy may be optionally made by a creator of the application. Furthermore, the association between the geographical range and the information indicating the required accuracy may be made, on the basis of the density of the peripheral buildings.

(2) Flow of Processing

Figure 12:
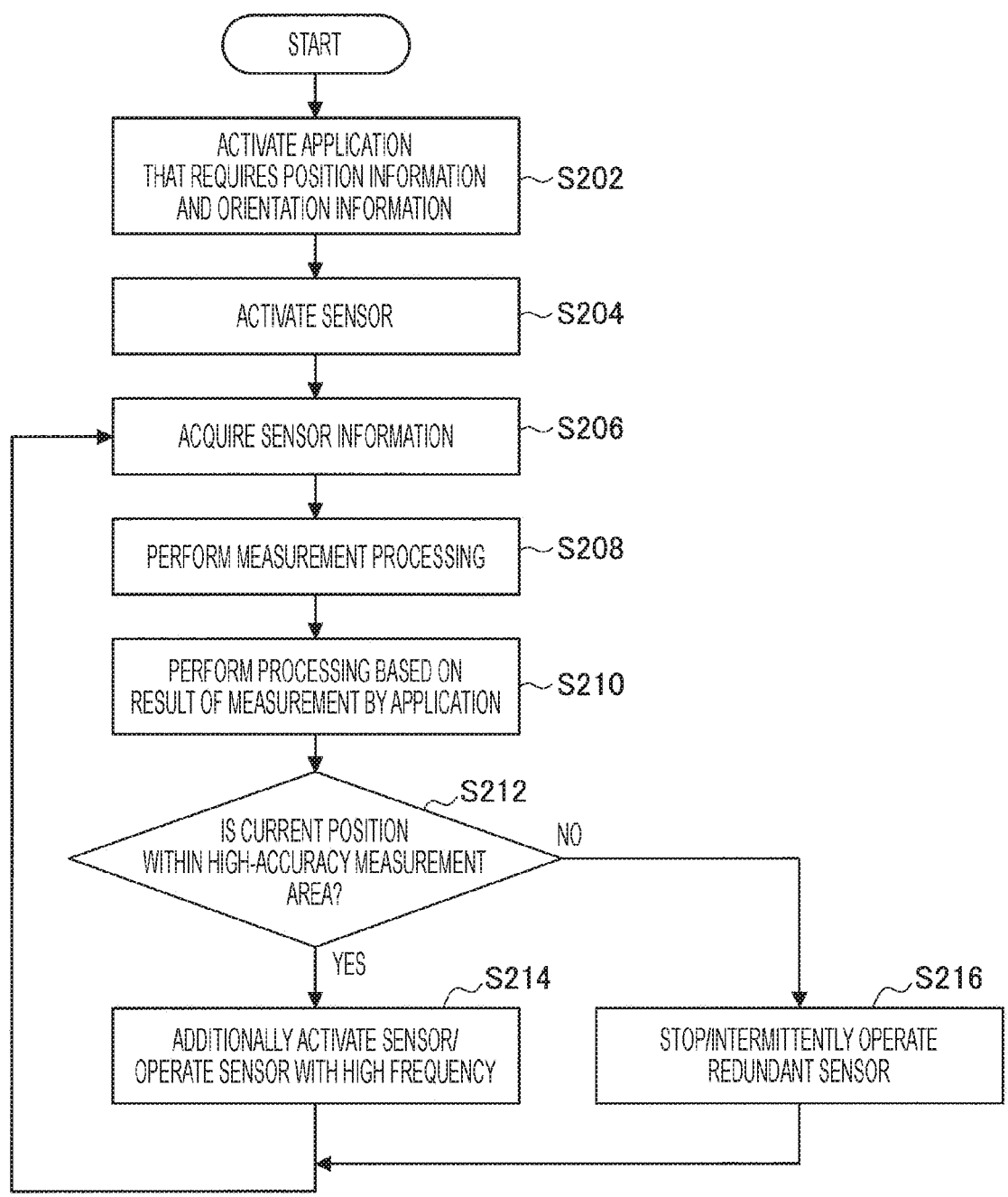
FIG. 12 is a flowchart of an exemplary flow of sensor control processing performed by the HMD according to the embodiment.

FIG. 12 is a flowchart of an exemplary flow of sensor control processing performed by the HMD 100 according to the present embodiment. As illustrated in FIG. 12, first, the HMD 100 activates an application that requires position information and orientation information (step S202). Next, the HMD 100 activates a sensor (step S204). Next, the HMD 100 acquires sensor information detected by the sensor (step S206). Next, the HMD 100 performs measurement processing including position measurement and orientation measurement based on the sensor information (step S208). Next, the application performs processing based on the result of the measurement (step S210). Next, the HMD 100 determines whether or not the current position is within a high-accuracy measurement area (step S212). In a case where the HMD 100 determines that the current position is within the high-accuracy measurement area (step S212/YES), the HMD 100 additionally activates a sensor, or operates the sensor with high frequency (step S214). On the other hand, in a case where the HMD 100 determines that the current position is out of the high-accuracy measurement area (step S212/NO), the HMD 100 stops or intermittently operates a redundant sensor (step S216). Thereafter, the processing returns back to step S206 again.

4. Third Embodiment

The present embodiment is an embodiment in which sensor control is performed on the basis of information indicating accuracy required from an application and measurement accuracy. Hereinafter, the present embodiment will be described with reference to FIGS. 13 to 15.

<4.1. Overview>

Figure 13:
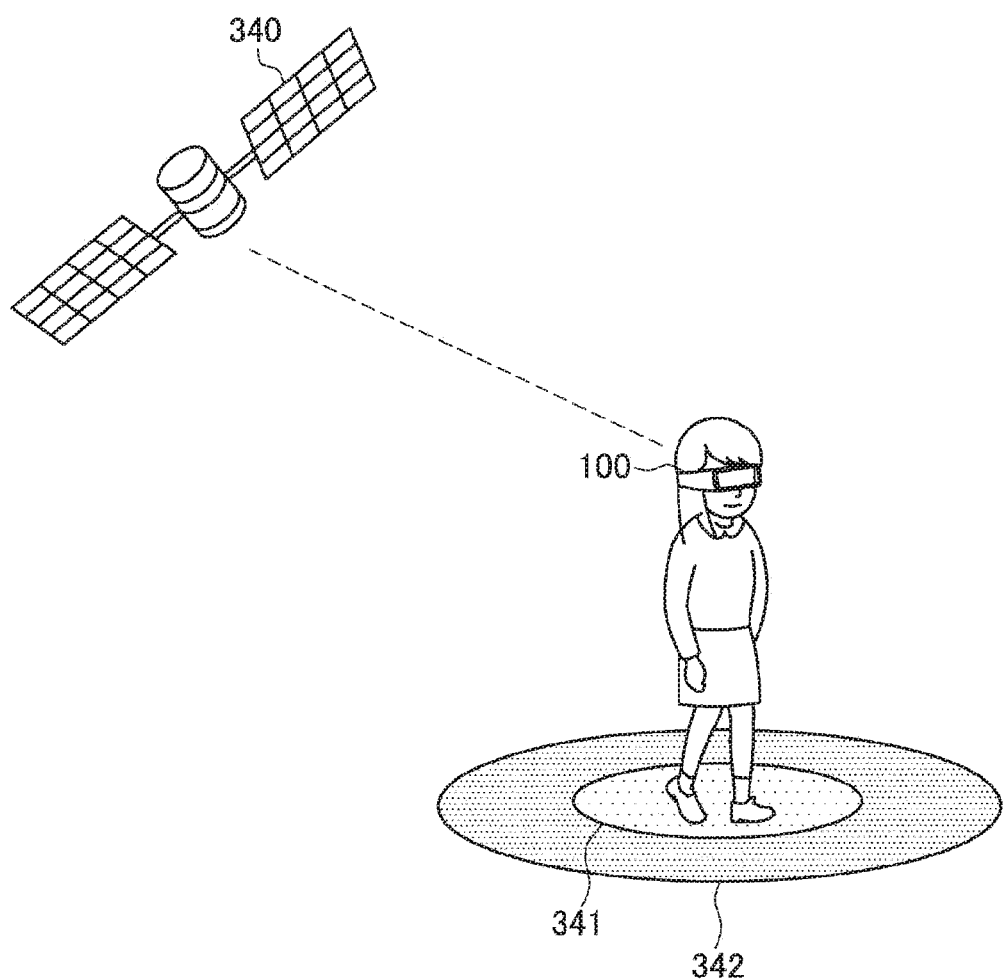
FIG. 13 is an illustration for describing the overview of a third embodiment.

FIG. 13 is an illustration for describing the overview of the present embodiment. As illustrated in FIG. 13, the user wearing an HMD 100 is taking a walk. Then, an application provides route guidance to the user. As described in the first embodiment, the HMD 100 performs sensor control in accordance with accuracy required by an application. Moreover, in the present embodiment, the HMD 100 performs sensor control in accordance with measurement accuracy.

The HMD 100 is capable of GNSS signal reception from a GNSS satellite 340 to measure position information. In a case where the reception intensity of the GNSS signal is high, the measurement accuracy of the position information is high, and in a case where the reception intensity is low, the measurement accuracy of the position information is low. For example, in a case where the reception intensity of the GNSS signal is high, as illustrated in FIG. 13, a range 341 of position information specified on the basis of the GNSS signal is narrower than an error allowable range 342 required by the application (the narrower the range is, the higher the measurement accuracy is, whereas the wider the range is, the lower the measurement accuracy is). As a result, it can be said that there is room for reduction in power consumption.

Thus, in a case where the measurement accuracy of the position information based on the GNSS signal is higher than the accuracy required by the application, the HMD 100 stops a redundant sensor such as a camera or operates the sensor intermittently. On the other hand, in a case where the measurement accuracy of the position information based on the GNSS signal is lower than the accuracy required by the application, the HMD 100 additionally activates a sensor such as a camera, or operates the sensor with high frequency. As described above, the HMD 100 can perform finer sensor control by taking the measurement accuracy into account in addition to the accuracy required by the application.

<4.2. Technical Features>

(1) Exemplary Configuration

Figure 14:
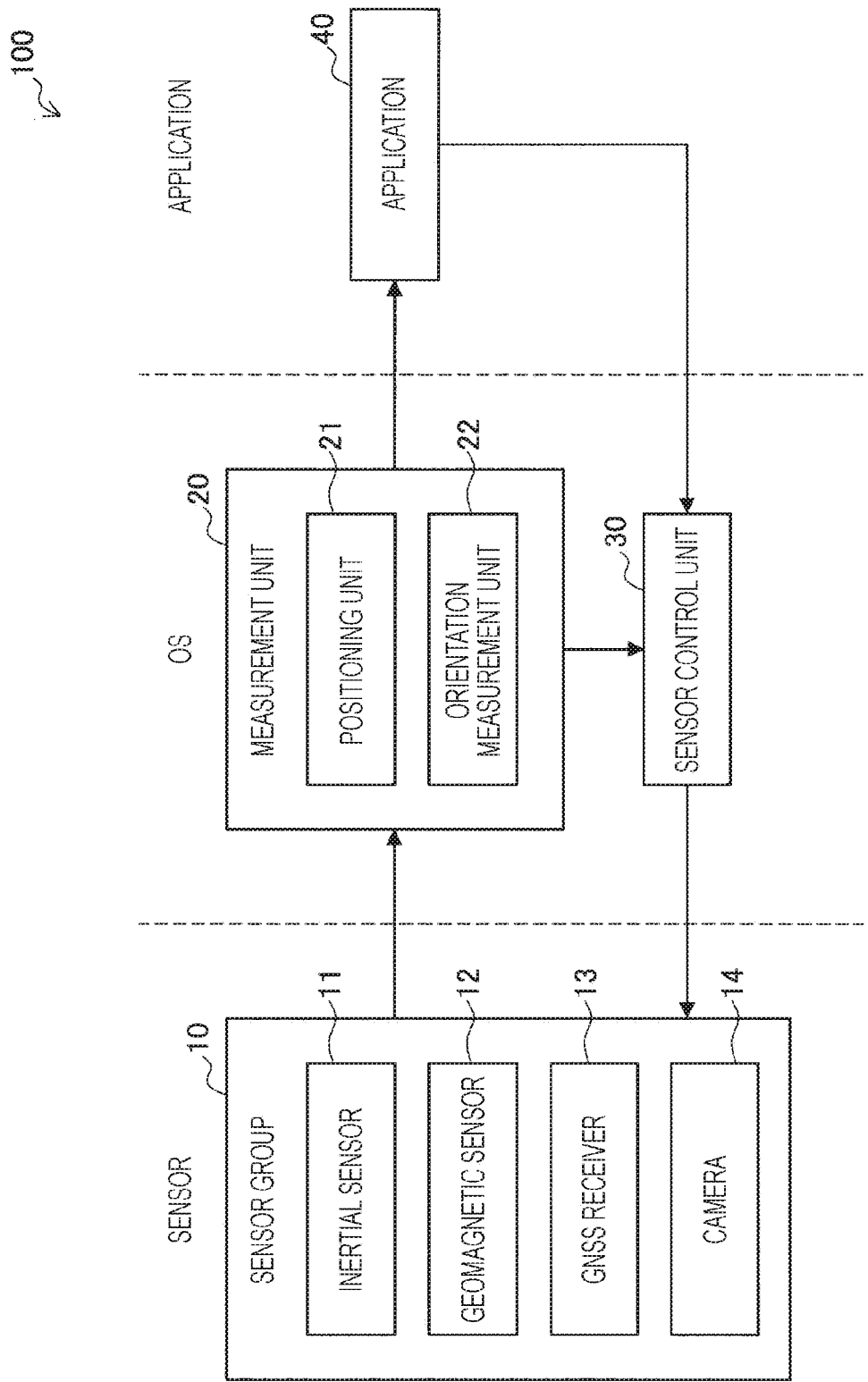
FIG. 14 is a block diagram of an exemplary internal configuration of an HMD according to the embodiment.

FIG. 14 is a block diagram of an exemplary internal configuration of the HMD 100 according to the present embodiment. As illustrated in FIG. 14, the HMD 100 according to the present embodiment has constituent elements similar to the constituent elements of the basic configuration illustrated in FIG. 2, and further has a notification path for information from an application 40 to a sensor control unit 30, and a notification path for information from a measurement unit 20 to the sensor control unit 30.

The application 40 generates information indicating required accuracy and notifies the sensor control unit 30 of the information, as described in the first embodiment.

The measurement unit 20 notifies the sensor control unit 30 of measurement information. For example, the measurement unit 20 notifies the sensor control unit 30 of the measurement information periodically or non-periodically. Moreover, the measurement unit 20 may notify the sensor control unit 30 of information indicating the accuracy of the measurement information. Examples of the information indicating the accuracy of the measurement information that can be considered include information indicating the reception intensity of the GNSS signal and information indicating the intensity of motion.

The sensor control unit 30 acquires the information indicating the required accuracy notified from the application 40. The sensor control unit 30 may notify the application 40 of a request for notifying the information indicating the required accuracy to cause the application 40 to issue notification on the information indicating the required accuracy.

The sensor control unit 30 acquires the measurement information and the information indicating the accuracy notified from the measurement unit 20. The sensor control unit 30 may notify the measurement unit 20 of a request for notifying these pieces of information to cause the measurement unit 20 to issue notification on these pieces of information.

Then, the sensor control unit 30 controls the sensor group 10, on the basis of the accuracy of the measurement information acquired from the measurement unit 20 and the information indicating the required accuracy acquired from the application 40. Specifically, in a case where the measurement accuracy of the measurement information is more excessive (e.g., excessively higher) than the accuracy required by the application, the sensor control unit 30 may stop a redundant sensor or operate the sensor intermittently. On the other hand, in a case where the measurement accuracy of the position information or orientation information is lower than the accuracy required by the application, the sensor control unit 30 additionally activates a sensor, or operates the sensor with high frequency. This arrangement enables the HMD 100 to perform finer sensor control as compared with a case where only the information indicating the accuracy required from the application is used and power consumption can be thus further suppressed.

Note that a threshold may be used in order to determine whether or not the measurement accuracy is excessive. Furthermore, the sensor control unit 30 may perform feedback control so as to satisfy the required accuracy, while switching the control pattern of a sensor.

(2) Flow of Processing

Figure 15:
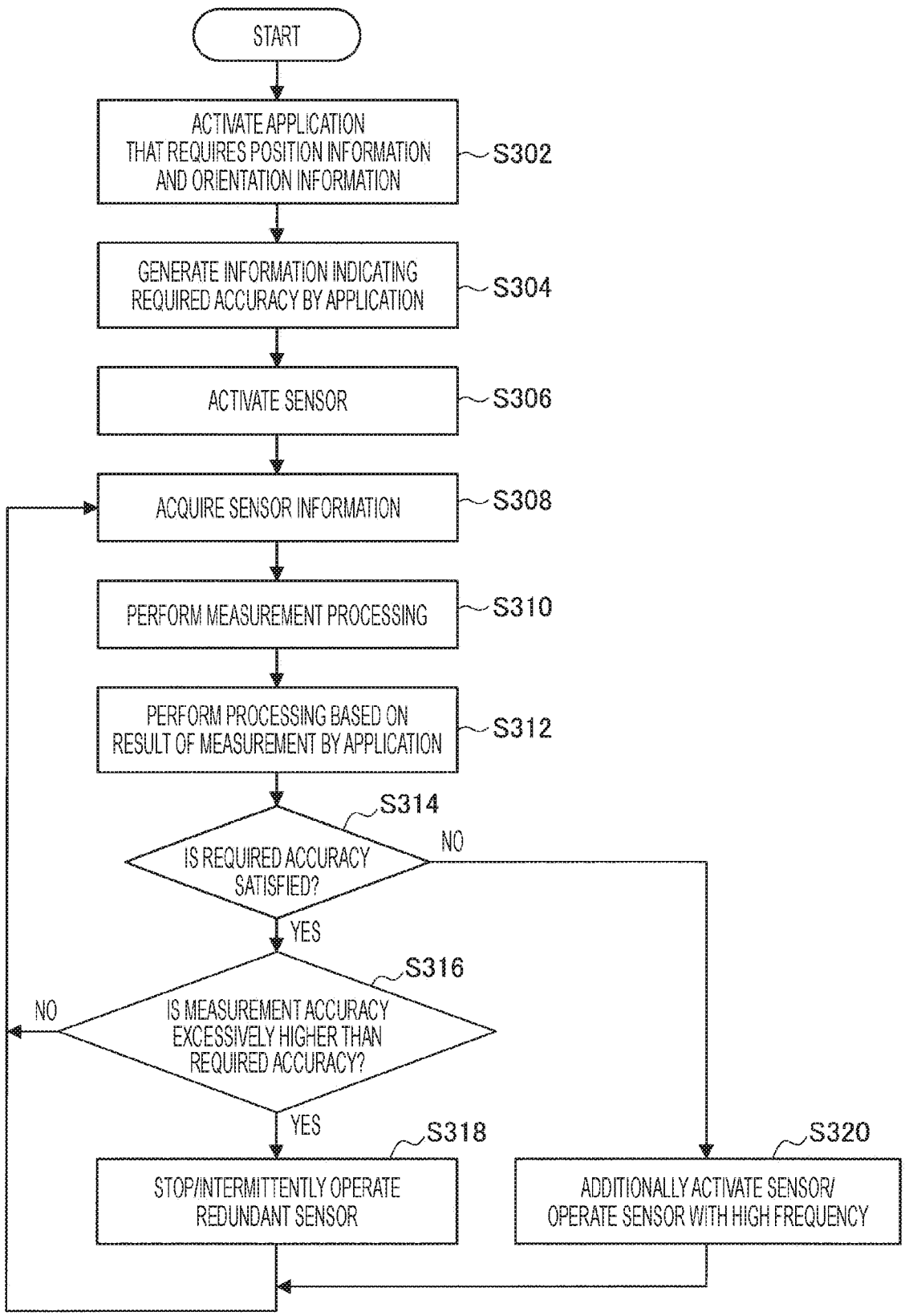
FIG. 15 is a flowchart of an exemplary flow of sensor control processing performed by the HMD according to the embodiment.

FIG. 15 is a flowchart of an exemplary flow of sensor control processing performed by the HMD 100 according to the present embodiment. As illustrated in FIG. 15, first, the HMD 100 activates an application that requires position information and orientation information (step S302). Next, the activated application generates information indicating required accuracy (step S304). Next, the HMD 100 activates a sensor on the basis of the information indicating the required accuracy (step S306). Next, the HMD 100 acquires sensor information detected by the sensor (step S308). Next, the HMD 100 performs measurement processing including position measurement and orientation measurement based on the sensor information (step S310). Next, the application performs processing based on the result of the measurement (step S312). Next, the HMD 100 determines whether or not the result of the measurement satisfies the required accuracy (step S314). In a case where it is determined that the required accuracy is satisfied (step S314/YES), the HMD 100 determines whether or not the measurement accuracy is excessively higher than the required accuracy (step S316). In a case where it is determined that the measurement accuracy is excessively higher (step S316/YES), the HMD 100 stops or intermittently operates a redundant sensor (step S318). Thereafter, the processing returns back to step S308 again. On the other hand, in a case where it is determined that the measurement accuracy is not excessively higher (step S316/NO), the processing returns back to step S308 again. Furthermore, in a case where it is determined in step S314 that the required accuracy is not satisfied (step S314/NO), the HMD 100 additionally activates a sensor, or operates the sensor with high frequency (step S320). Thereafter, the processing returns back to step S308 again.

5. Supplement

Sensor control methods can be considered variously, in addition to the methods described above.

The HMD 100 may discriminate between GNSS priority and camera priority to switch a sensor to be operated, on the basis of orientation information. For example, the HMD 100 operates a GNSS receiver 13 in a case where an image of the sky is captured because the user is looking up at the sky, and operates a camera 14 in a case where an image with feature points can be captured because the user is looking at the ground.

The HMD 100 discriminates between GNSS priority and camera priority to switch a sensor to be operated, on the basis of position information. For example, the HMD 100 operates the camera 14 in a downtown and operates the GNSS receiver 13 in a park.

The HMD 100 may switch a sensor to be operated, on the basis of orientation measurement accuracy. For example, the HMD 100 operates a sensor that greatly contributes to the orientation measurement accuracy in a case where the orientation measurement accuracy is high. Examples of such a sensor include a GNSS receiver that receives a dual-frequency GNSS signal for obtaining inter-GNSS signal difference in time, a stereo camera for visual odometry, and a geomagnetic sensor.

The HMD 100 may switch a sensor to be operated, on the basis of position measurement accuracy. For example, the HMD 100 operates a sensor that greatly contributes to orientation position accuracy in a case where the position measurement accuracy is high. Examples of such a sensor include a GNSS receivers for map matching.

The HMD 100 may operate all sensors in a place where charging is easy, such as the user's home, and may stop a sensor with high power consumption in a place where charging is difficult, such as the outdoors.

The HMD 100 may control a sensor on the basis of the remaining battery capacity associated with a sensor. For example, in a case where sensors are separately included in a plurality of devices, the HMD 100 preferentially operates a sensor of a device with large remaining battery capacity and stops a sensor of a device with small remaining battery capacity. Furthermore, for example, in a case where the HMD 100 has its own battery with small remaining capacity, the HMD 100 stops a sensor of the HMD 100 itself and preferentially operates a sensor of a different device. In such a manner, the HMD 100 enables optimization for power consumption across the associated device group.

The HMD 100 may stop a camera for a dark or extremely bright peripheral environment.

The HMD 100 may reduce the number of sensors to be operated in a case where the HMD 100 itself or an application is in a power saving mode.

In addition to the ON/OFF of a sensor, the HMD 100 may suppress power consumption by, for example, quantifying arithmetic processing with approximate calculation.

In addition to the ON/OFF of a sensor, the HMD 100 may suppress power consumption by, for example, stopping correction of the result of measurement through network communication.

The HMD 100 may present a power consumption list of sensors to the user, and may perform sensor control on the basis of a user input. The user may designate, for example, the ON/OFF of a sensor, or may set the ON/OFF of a sensor correlated to a place.

For a low temperature, the HMD 100 may operate a sensor with large power consumption to generate heat.

6. Exemplary Hardware Configuration

Figure 16:
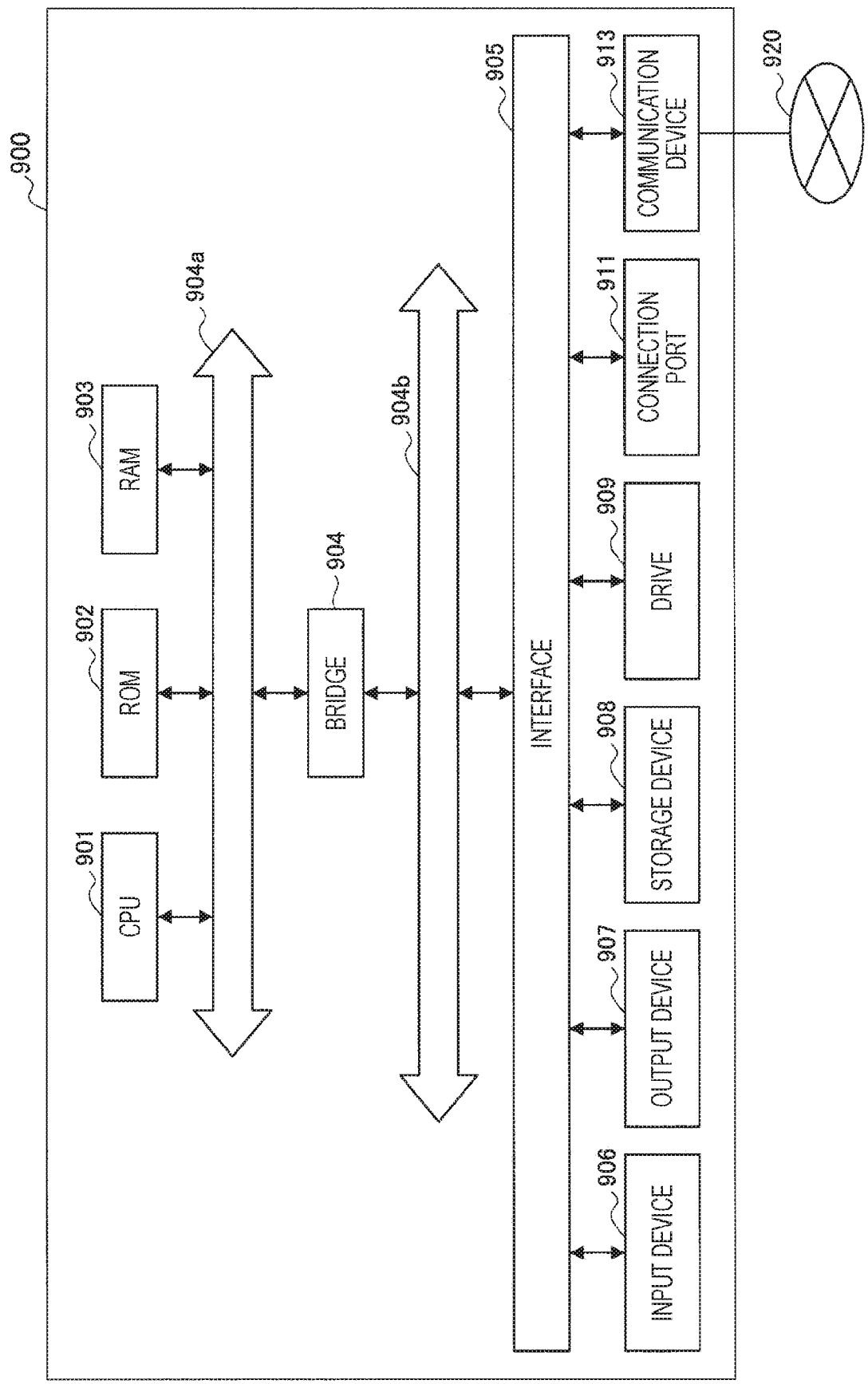
FIG. 16 is a block diagram of an exemplary hardware configuration of an information processing apparatus according to the present embodiment.

Finally, the hardware configuration of an information processing apparatus according to the present embodiment will be described with reference to FIG. 16. FIG. 16 is a block diagram of an exemplary hardware configuration of the information processing apparatus according to the present embodiment. Note that an information processing apparatus 900 illustrated in FIG. 16 can achieve, for example, the information processing apparatus 100 illustrated in FIGS. 1 and 2. Information processing by the information processing apparatus 100 according to the present embodiment is achieved by cooperation of software and hardware described below.

As illustrated in FIG. 16, the information processing apparatus 900 includes a central processing unit (CPU) 901, a read only memory (ROM) 902, a random access memory (RAM) 903, and a host bus 904a. Furthermore, the information processing apparatus 900 includes a bridge 904, an external bus 904b, an interface 905, an input device 906, an output device 907, a storage device 908, a drive 909, a connection port 911, and a communication device 913. The information processing apparatus 900 may have a processing circuit such as an electric circuit, a digital signal processor (DSP), or an application specific integrated circuit (ASIC), instead of or in addition to the CPU 901.

The CPU 901 functions as an arithmetic processing device and a control device, and controls the overall operation in the information processing apparatus 900 in accordance with various programs. Furthermore, the CPU 901 may be a microprocessor. The ROM 902 stores, for example, programs and arithmetic parameters to be used by the CPU 901. The RAM 903 temporarily stores, for example, programs to be used for execution by the CPU 901, and parameters that appropriately change in the execution. The CPU 901 can operate as, for example, the measurement unit 20, the sensor control unit 30, and the application 40 illustrated in FIG. 2.

The CPU 901, the ROM 902, and the RAM 903 are mutually connected through a host bus 904a including a CPU bus and the like. The host bus 904a is connected to the external bus 904b such as a peripheral component interconnect/interface (PCI) bus through the bridge 904. Note that the host bus 904a, the bridge 904, and the external bus 904b are not necessarily separated, and these functions may be implemented on one bus.

The input device 906 is achieved by a device such as a mouse, a keyboard, a touch panel, a button, a microphone, a switch, and a lever, with which the user inputs information, for example. Furthermore, the input device 906 may be, for example, a remote control device using infrared rays or other radio waves, or may be an external connection device such as a mobile phone or a personal digital assistant (PDA) in response to an operation of the information processing apparatus 900. Moreover, the input device 906 may generate an input signal on the basis of an input by the user with the above input device, and may include an input control circuit or the like that outputs the input signal to the CPU 901, for example. The user of the information processing apparatus 900 operates the input device 906, whereby the user can input various types of data to the information processing apparatus 900 and instruct the information processing apparatus 900 of processing operations.

Besides, the input device 906 can include a device that senses information regarding the user. For example, the input device 906 can include various sensors such as an image sensor (e.g., camera), a depth sensor (e.g., stereo camera), an accelerometer, a gyro sensor, a geomagnetic sensor, an optical sensor, a sound sensor, a range sensor, and a force sensor. Furthermore, the input device 906 may acquire information regarding the state of the information processing apparatus 900 itself, such as the orientation and moving speed of the information processing apparatus 900, and information regarding peripheral environment of the information processing apparatus 900, such as brightness and noise in the periphery of the information processing apparatus 900. Furthermore, the input device 906, for example, includes a GNSS module that receives a GNSS signal from a global navigation satellite system (GNSS) satellite (e.g., a GPS signal from a global positioning system (GPS) satellite) to measure positioning information including the latitude, longitude, and altitude of the device. Furthermore, regarding to the position information, the input device 906 may be a device that senses position by transmission and reception with, for example, Wi-Fi (registered trademark), a mobile phone, a personal handyphone system (PHS), or a smartphone, or short distance communication and the like. The input device 906 can include, for example, the inward cameras 111, the outward camera 112 illustrated in FIG. 1, and the sensor group 10 illustrated in FIG. 2.

The output device 907 may include a device that visually or aurally notifies the user of acquired information. Examples of such a device include display devices such as a cathode ray tube (CRT) display device, a liquid crystal display device, a plasma display device, an electroluminescent (EL) display device, a laser projector, a light-emitting diode (LED) projector, and a lamp; sound output devices such as a speaker, and a headphone; and a printer device. The output device 907 outputs, for example, results obtained by various types of processing performed by the information processing apparatus 900. Specifically, the display device visually displays the results obtained by the various types of processing performed by the information processing apparatus 900, in various formats such as text, an image, a table, and a graph. Meanwhile, the sound output device converts an audio signal including, for example, reproduced sound data and reproduced acoustic data into an analog signal, and aurally outputs the resultant signal. The output device 907 can include, for example, the display unit 121 illustrated in FIG. 1.

The storage device 908 serves as a device that stores data, the storage device 908 being included, as an exemplary storage unit, in the information processing apparatus 900. The storage device 908 is achieved by, for example, a magnetic storage unit device such as a hard disk drive (HDD), a semiconductor storage device, an optical storage device, or a magneto-optical storage device. The storage device 908 may include a storage medium, a recording device that records data in the storage medium, a reading device that reads data from the storage medium, and a deletion device that deletes data recorded in the storage medium. The storage device 908 stores, for example, programs to be executed by the CPU 901, various types of data, and various types of data acquired externally.

The drive 909 serves as a reader/writer for a storage medium, and is built in or externally attached to the information processing apparatus 900. The drive 909 reads information recorded in a removable storage medium such as an attached magnetic disk, optical disk, magneto-optical disk, or semiconductor memory, and outputs the information to the RAM 903. Furthermore, the drive 909 can also write information to a removable storage medium.

The connection port 911 serves as an interface connected to an external apparatus, and serves as a connection port to an external apparatus capable of transmitting data, with, for example, universal serial bus (USB).

The communication device 913 serves, for example, as a communication interface including, for example, a communication device for connecting to a network 920. Examples of the communication device 913 include a communication card for wired or wireless local area network (LAN), long term evolution (LTE), Bluetooth (registered trademark), or wireless USB (WUSB). Furthermore, the communication device 913 may be, for example, a router for optical communication, a router for asymmetric digital subscriber line (ADSL), or a modem for various types of communication. The communication device 913 is capable of signal transmission and reception or the like, in conformance with a predetermined protocol such as TCP/IP, with the Internet or a different communication device, for example. The communication device 913 can include one of the sensors included in the sensor group 10 illustrated in FIG. 2, for example.

Note that the network 920 serves as a wired or wireless transmission channel for information to be transmitted from a device connected to the network 920. For example, the network 920 may include a public network such as the Internet, a telephone network, or a satellite communication network; various local area networks (LANs) including Ethernet (registered trademark); or various wide area networks (WANs). Furthermore, the network 920 may include a dedicated line network such as an internet protocol-virtual private network (IP-VPN).

Hereinabove, the exemplary hardware configuration that can achieve the functions of the information processing apparatus 900 according to the present embodiment has been indicated. Each of the constituent elements described above may be achieved by including a general-purpose member, or may be achieved by hardware specialized for the respective functions of the constituent elements. Thus, the hardware configuration to be used is appropriately changeable, in accordance with a technical level at carrying out the present embodiment.

Note that a computer program for achieving each function of the information processing apparatus 900 according to the present embodiment as described above can be created and implemented on a PC or the like. Furthermore, there can be provided a computer readable recording medium that has such a computer program stored therein. Examples of the recording medium include a magnetic disk, an optical disk, a magneto-optical disk, and a flash memory. Furthermore, the above computer program may be distributed through, for example, a network without using a recording medium.

7. Conclusion

Hereinabove, each of the embodiments of the present disclosure has been described in detail with reference to FIGS. 1 to 16. As described above, the information processing apparatus 100 according to the embodiments acquires information indicating the required accuracy of the measurement information from the application that uses the measurement information based on the result of detection by the sensor, and controls the sensor on the basis of the information indicating the required accuracy. The information processing apparatus 100 is capable of sensor control on the basis of the required accuracy. Thus, the information processing apparatus 100 controls the sensor to reduce power consumption for the excessive measurement accuracy, and the information processing apparatus 100 controls the sensor for the insufficient measurement accuracy, thereby making it possible to satisfy the required accuracy. As a result, for example, regarding to an AR application operating in the HMD, the sensor with high power consumption is switched off for the allowable required accuracy, thereby making it possible to extend the continuous usable time.

The preferred embodiments of the present disclosure have been described above in detail with reference to the accompanying drawings; however, the technical scope of the present technology is not limited to the examples. It is obvious that persons having ordinary knowledge in the technical field of the present disclosure can conceive various alternation examples or modification examples within the scope of the technical idea described in the claims, and it is naturally understood that such alternation examples or modification examples belong to the technical scope of the present disclosure.

For example, although the examples of the cases where the position information and the orientation information are measured have been described in the above embodiments; however, the present technology is not limited to the examples. For example, the present technology may be applied to various measurement processing based on sensor information, such as image recognition processing, sound recognition processing, speed measurement processing, and environmental information measurement processing. The information processing apparatus 100 is capable of sensor control in accordance with the accuracy of measurement information, for any measurement processing.

Furthermore, the above embodiments can be combined appropriately. For example, the first embodiment and the second embodiment may be combined. In this case, the information processing apparatus 100 controls a sensor, on the basis of information indicating required accuracy corresponding to a geographical range in the predetermined geographical range, and controls the sensor outside the geographical range, on the basis of information indicating required accuracy acquired from an application. Furthermore, the second embodiment and the third embodiment may be combined. In this case, in this case, the information processing apparatus 100 controls a sensor, on the basis of information indicating required accuracy corresponding to a geographical range in the predetermined geographical range, and controls the sensor outside the geographical range, on the basis of information indicating required accuracy acquired from an application and accuracy of measurement information.

Furthermore, the pieces of processing described with the flowcharts in the present specification may not necessarily be performed in the illustrated sequence. Some processing steps may be performed parallelly. Furthermore, an additional processing step may be adopted, and some processing steps may be omitted.

Furthermore, the effects described in the present specification are merely explanatory or exemplary, and are not restrictive. That is, the technology according to the present disclosure can exhibit other effects obvious to those skilled in the art from the description of the present specification, together with or instead of the above effects.

Note that, the following configurations also belong to the technical scope of the present disclosure.

(1)

An information processing apparatus including:

a control unit configured to acquire information indicating required accuracy of measurement information based on a result of detection by a sensor from an application that uses the measurement information, and control the sensor on the basis of the information indicating the required accuracy.

(2)

The information processing apparatus according to (1) described above, in which the control unit controls the sensor further on the basis of power consumption of the sensor.

(3)

The information processing apparatus according to (2) described above, in which the control unit controls the sensor such that a sum total of the power consumption is minimized with the required accuracy satisfied.

(4)

The information processing apparatus according to (2) or (3) described above, in which the control unit controls the sensor on the basis of a remaining battery capacity associated with the sensor.

(5)

The information processing apparatus according to any one of (1) to (4) described above, in which the control unit controls at least any of activation/stop of the sensor, operation frequency of the sensor, or accuracy of the sensor.

(6)

The information processing apparatus according to any one of (1) to (5) described above, in which the measurement information includes at least either position information or orientation information.

(7)

The information processing apparatus according to (6) described above, in which the information indicating the required accuracy includes at least any of required accuracy of absolute position information, required accuracy of absolute orientation information, required accuracy of relative position information, or required accuracy of relative orientation information.

(8)

The information processing apparatus according to any one of (1) to (7) described above, in which the information indicating the required accuracy includes an index corresponding to the required accuracy.

(9)

The information processing apparatus according to any one of (1) to (8) described above, in which the information indicating the required accuracy includes information indicating availability of the sensor.

(10)

The information processing apparatus according to any one of (1) to (9) described above, in which the information indicating the required accuracy includes information indicating intensity of assumed motion.

(11)

The information processing apparatus according to any one of (1) to (10) described above, in which the information indicating the required accuracy includes information indicating an object as a reference in measurement of the measurement information that is relative.

(12)

The information processing apparatus according to any one of (1) to (11) described above, in which in a case where measured position information is included in a preset geographical range, the control unit controls the sensor on the basis of the information indicating the required accuracy corresponding to the geographical range.

(13)

The information processing apparatus according to any one of (1) to (12) described above, in which the control unit controls the sensor on the basis of accuracy of the measurement information and the information indicating the required accuracy.

(14)

An information processing apparatus including:

a control unit configured to perform processing with measurement information based on a result of detection by a sensor, and generate information indicating required accuracy of the measurement information in accordance with details of the processing.

(15)

The information processing apparatus according to (14) described above, in which the control unit performs processing of superimposing and displaying a virtual object in real space, and generates the information indicating the required accuracy in accordance with size of the virtual object, superimposition distance, superimposition accuracy, and necessity of occlusion processing.

(16)

An information processing method performed by a processor, including:

acquiring information indicating required accuracy of measurement information based on a result of detection by a sensor from an application that uses the measurement information; and controlling the sensor on the basis of the information indicating the required accuracy.

(17)

An information processing method performed by a processor, including:

performing processing with measurement information based on a result of detection by a sensor; and generating information indicating required accuracy of the measurement information in accordance with details of the processing.

(18)

A recording medium including a program recorded, the program causing a computer to function as a control unit configured to acquire information indicating required accuracy of measurement information based on a result of detection by a sensor from an application that uses the measurement information, and control the sensor on the basis of the information indicating the required accuracy.

(19)

A recording medium including a program recorded, the program causing a computer to function as a control unit configured to perform processing with measurement information based on a result of detection by a sensor, and generate information indicating required accuracy of the measurement information in accordance with details of the processing.

REFERENCE SIGNS LIST

10 Sensor group
11 Inertial sensor
12 Geomagnetic sensor
13 GNSS receiver

14 Camera
20 Measurement unit
21 Positioning unit
22 Orientation measurement unit
30 Sensor control unit
40 Application
100 Information processing apparatus, HMD
111 Inward camera
112 Outward camera
121 Display unit

The invention claimed is:

1. An information processing apparatus, comprising:
a control unit configured to:
acquire information indicating a required accuracy of measurement information from an application that uses the measurement information, wherein the information indicating the required accuracy is acquired from the application based on sensor information from a sensor; and
control the sensor based on the information indicating the required accuracy.

2. The information processing apparatus according to claim 1, wherein the control unit is further configured to control the sensor based on a power consumption of the sensor.

3. The information processing apparatus according to claim 2, wherein the control unit is further configured to control the sensor such that a sum total of the power consumption is minimized with the required accuracy satisfied.

4. The information processing apparatus according to claim 2, wherein the control unit is further configured to control the sensor based on a remaining battery capacity associated with the sensor.

5. The information processing apparatus according to claim 1, wherein the control unit is further configured to control at least one of
activation or stop of the sensor,
an operation frequency of the sensor, or
an accuracy of the sensor.

6. The information processing apparatus according to claim 1, wherein the measurement information includes at least one of position information or orientation information.

7. The information processing apparatus according to claim 6, wherein the information indicating the required accuracy of the measurement information includes at least one of a required accuracy of absolute position information, a required accuracy of absolute orientation information, a required accuracy of relative position information, or a required accuracy of relative orientation information.

8. The information processing apparatus according to claim 1, wherein the information indicating the required accuracy includes an index corresponding to the required accuracy.

9. The information processing apparatus according to claim 1, wherein the information indicating the required accuracy includes information indicating an availability of the sensor.

10. The information processing apparatus according to claim 1, wherein the information indicating the required accuracy includes information indicating an intensity of an assumed motion of the information processing apparatus.

11. The information processing apparatus according to claim 1, wherein the information indicating the required accuracy includes information indicating an object as a reference in measurement of relative measurement information.

12. The information processing apparatus according to claim 1, wherein
in a case where measured position information corresponds to a preset specific geographical range, the control unit is further configured to control the sensor based on the information indicating the required accuracy corresponding to the specific geographical range, and
the measured position information is based on the sensor information.

13. The information processing apparatus according to claim 1, wherein the control unit is further configured to control the sensor based on an accuracy of the measurement information and the information indicating the required accuracy.

14. An information processing apparatus, comprising:
a control unit configured to:
acquire measurement information based on sensor information output from a sensor;
execute specific processing based on the measurement information; and
generate information indicating a required accuracy of the measurement information based on the specific processing.

15. The information processing apparatus according to claim 14, wherein the control unit is further configured to:
superimpose and display virtual object in real space; and
generate the information indicating the required accuracy based on size of the virtual object, a superimposition distance corresponding to the virtual object, a superimposition accuracy, and a necessity of occlusion processing.

16. An information processing method performed by a processor, comprising:
acquiring information indicating a required accuracy of measurement information from an application that uses the measurement information, wherein the information indicating the required accuracy is acquired from the application based on sensor information from a sensor; and
controlling the sensor based on the information indicating the required accuracy.

17. An information processing method performed by a processor, comprising:
acquiring measurement information based on sensor information output from a sensor;
executing specific processing based on the measurement information; and
generating information indicating a required accuracy of the measurement information based on the specific processing.

18. A non-transitory computer-readable medium having stored thereon computer-executable instructions, which when executed by a processor, cause the processor to execute operations, the operations comprising:
acquiring information indicating a required accuracy of measurement information from an application that uses the measurement information, wherein the information indicating the required accuracy is acquired from the application based on sensor information from a sensor; and
control controlling the sensor based on the information indicating the required accuracy.

19. A non-transitory computer-readable medium having stored thereon computer-executable instructions, which when executed by a processor, cause the processor to execute operations, the operations comprising:

acquiring measurement information based on sensor information output from a sensor;

executing specific processing based on the measurement information; and generating information indicating a required accuracy of the measurement information based on the specific processing.

\* \* \* \* \*